(12) United States Patent
White

(10) Patent No.: US 6,370,245 B1
(45) Date of Patent: Apr. 9, 2002

(54) FULL DUPLEX COMMUNICATION CIRCUITS WITH BILATERAL T HYBRID AND BALANCED IMPEDANCE CONFIGURATIONS

(75) Inventor: Donald R. White, Aloha, OR (US)

(73) Assignee: Konetics, Inc., Portland, OR (US)

( * ) Notice: Subject to any disclaimer, the term of this patent is extended or adjusted under 35 U.S.C. 154(b) by 0 days.

(21) Appl. No.: 08/989,816

(22) Filed: Dec. 12, 1997

Related U.S. Application Data

(63) Continuation-in-part of application No. 08/801,525, filed on Feb. 18, 1997, now Pat. No. 5,907,538.

(51) Int. Cl.[7] .................................................. H04M 1/62
(52) U.S. Cl. ............................. 379/390.04; 379/388.03; 379/390.03
(58) Field of Search .................................. 379/387, 388, 379/389, 390, 391, 394, 395, 387.01, 388.01, 388.03, 390.01, 390.03, 390.04; 370/282, 288, 276

(56) References Cited

U.S. PATENT DOCUMENTS

| | | | |
|---|---|---|---|
| 3,114,105 A | 12/1963 | Neumiller | 325/16 |
| 3,370,236 A | 2/1968 | Walker | 325/16 |
| 4,002,860 A | 1/1977 | Terai et al. | 179/170 R |
| 4,065,646 A | 12/1977 | Schuh | |
| 4,629,829 A | 12/1986 | Puhl et al. | 379/58 |
| 4,691,313 A | 9/1987 | Iwata | |
| 4,741,018 A * | 4/1988 | Potratz et al. | 370/278 |
| 5,007,046 A | 4/1991 | Erving et al. | 370/32.1 |
| 5,202,918 A * | 4/1993 | White | 379/390 |
| 5,235,637 A | 8/1993 | Kraz et al. | |
| 5,265,264 A | 11/1993 | Dzunt et al. | 455/90 |
| 5,311,144 A | 5/1994 | Grasset | |
| 5,379,450 A | 1/1995 | Hirasawa et al. | 455/54.2 |
| 5,393,989 A | 2/1995 | Gempe et al. | |
| 5,465,298 A | 11/1995 | Wilkison et al. | |
| 5,471,666 A | 11/1995 | Sugiyama et al. | 455/348 |
| 5,715,309 A | 2/1998 | Bartkowiak | |

OTHER PUBLICATIONS

Bilateral Speaker Networks Form Switchless Intercom, Frank Kasparec, St. Poelten, Austria, Electronics, vol. 53, p. 131, Jul. 3, 1980.

Compandor IC (Noise Reduction System), TK10651M, –L, –D, TOKO SEMICONDUCTOR, Catalog No. Z–1480110E.

D5004 Cellular Telephone Echo Control Device, DSP Group, Inc. Jan., 1991, Rev. 2.0.

Telephone Coupling Transformer, Mouser Electronics, Feb. 16, 1995.

(List continued on next page.)

Primary Examiner—Stella Woo

(57) ABSTRACT

Full duplex circuits provide a bi-directional signal path at one port for transmit and receive signals and also provide separation between the transmit and receive signals at their respective ports. To accomplish this, the circuits employ amplifiers arranged in either a bilateral T hybrid or balanced impedance configuration. One application is in a transducer interface, where a single transducer is used as both a speaker/ear phone and a microphone. Another application is in a telephone line interconnect, where the telephone line interface simultaneously transmits and receives electrical signals representing audio data, e.g., voice data. The transducer interface drives a receive signal onto a transducer to create audio output while simultaneously generating a transmit signal from audio input. The telephone line interconnect drives a transmit signal through a transformer to send the transmit signal to a telephone line while simultaneously transferring a receive signal from the telephone line. In both applications, the circuits provide a bi-directional signal path (simultaneous transmit and receive signals) at one port and achieve separation of the transmit and receive signals at respective transmit and receive ports.

28 Claims, 11 Drawing Sheets

U.S. PATENT DOCUMENTS

Audio Transformers Telephone Coupling, MagnaTek, 90 East Union Street, GoOdland, IN 47948.

Engineering Bulletin, Magnetek Goodland, pp. 2–3.

Low Voltage Compander, Specification and Applications Information, Motorola Semiconductors, MC33110.

LA8632M, Case Outline: MFP–24S(300mil) Plastic Package.

PCT, International Search Report, Application No. PCT/US97/22887, Jan. 4, 1999.

* cited by examiner

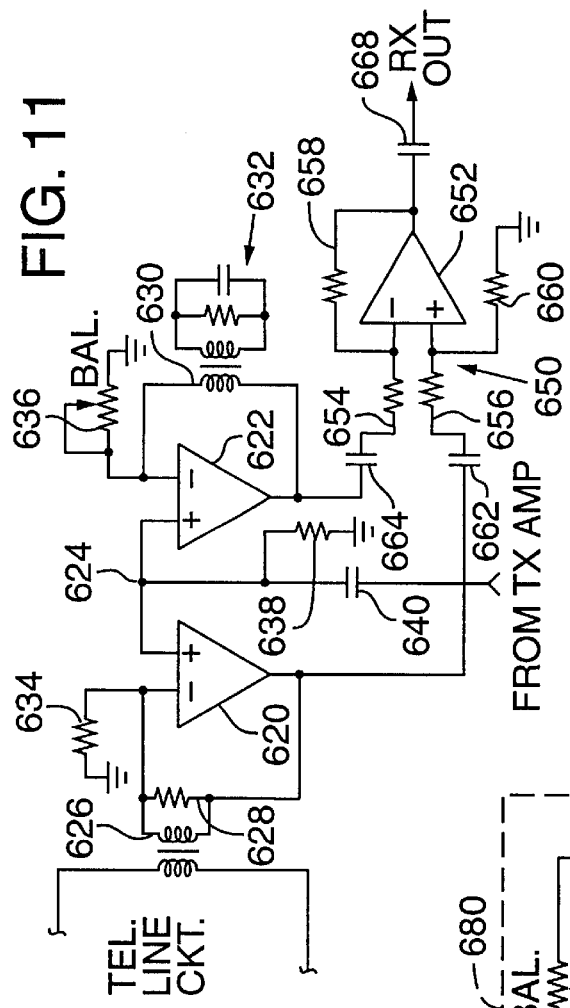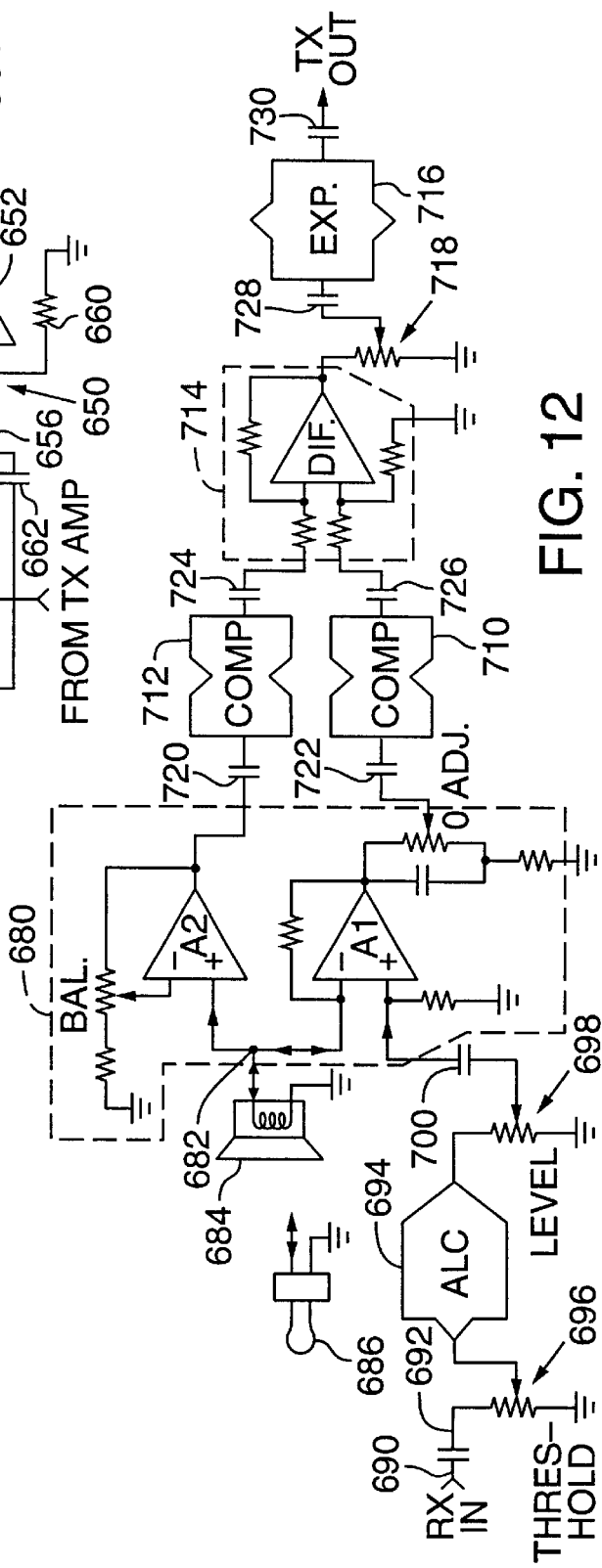

FULL DUPLEX COMMUNICATION CIRCUITS WITH BILATERAL T HYBRID AND BALANCED IMPEDANCE CONFIGURATIONS

RELATED APPLICATION DATA

This application is a continuation-in-part of U.S. patent application Ser. No. 08/801,525, filed Feb. 18, 1997, now U.S. Pat. No. 5,907,538.

FIELD OF THE INVENTION

The invention relates to audio communication circuitry and more specifically relates to full duplex communication using a transducer that simultaneously acts as both a microphone and speaker.

BACKGROUND OF THE INVENTION

The term "full duplex" in the context of a communication device means that the device simultaneously transmits and receives signals. To the user, this means that he or she can simultaneously talk and listen to another party through the device. Conversely, the term "half duplex" in this context means that the device can only transmit or receive at one time, but not both. Full duplex is obviously better than half duplex communication because it enables parties to communicate from remote locations as if they were standing face to face. However, full duplex communication is more difficult to implement in speaker phones because of the problem of acoustical and electrical feedback. Acoustical feedback occurs when sound travels back to the microphone. Electrical feedback is similar, yet pertains to the electrical signals representing the audio input (the signal transmitted to the remote device) and the audio output (the signal received from the remote source). Electrical feedback occurs when the transmit and receive circuits are not completely isolated from each other and form a closed loop with a loop gain greater than one. To eliminate feedback entirely, the overall loop gain, including both acoustical and electrical effects, must be less than one.

The majority of speaker phones for hands-free and group communication are half duplex configurations that utilize fast switching circuitry to alternate between: 1) broadcasting audio output through a speaker, and 2) listening for audio input in a separate microphone. If this switching did not take place, the speaker would produce an annoying squeal due to the acoustical feedback path from the speaker to the microphone. The switching circuitry prevents the speaker and microphone from being active at the same time, and therefore, audio output from the speaker will not induce electrical signals in the microphone. While the switching avoids the squeal, it can be annoying in itself because the user cannot speak and listen at the same time. The switching circuitry compares the strength of the broadcast signals from each direction and allows only the stronger of the two to be transmitted to the opposite end.

Since full duplex communication requires a complete closed loop for simultaneously sending and receiving signals between the two locations of conversation, the overall loop gain must be less than one. One way to ensure that the loop gain is less than one is to use digital signal processing to detect feedback and attempt to cancel it. Speaker phones that employ this approach are sometimes referred to as digital full duplex speaker phones. These devices include a separate speaker and microphone, and an analog to digital conversion circuit to recognize, with adaptive filters, the signal gain variances between the transmit and receive signal paths caused by audio output of the receive signal entering the transmit portion of the loop via the microphone. In response to detecting this feedback, these devices use electronically controlled attenuators in each side of the loop to ensure that the loop gain is less than one.

While the attenuators can reduce the annoying squeal of feedback, they can tend to undermine performance of the device by reducing the gain on the audio output to such an extent that is difficult for the user to hear. At times, the attenuator needs to reduce the gain on the receive signal so much that the user cannot here the other party's voice. In addition to this drawback, the digital configurations are several times more costly then the half duplex speaker phone configurations.

One proposed solution to the acoustical feedback problem is shown in U.S. Pat. No. 4,002,860, which describes a communication device that uses a single transducer as both a speaker and microphone to eliminate acoustical feedback. The circuit design shown in this patent does not effectively eliminate electrical feedback however. This circuit uses devices called hybrid transformers in an attempt to isolate the transmit and receive signals from each other. The telephone circuits used to provide isolation in this circuit are actually only capable of providing about 15dB of isolation. The amount of isolation is also highly dependent on the degree to which the circuit can match the impedance of the transducer and of the telephone line. Because of the circuit's inability to isolate the transmit and receive signals, it will generate a significant amount of feedback for this reason alone.

Another drawback of the circuit shown in the '860 patent is that the circuit applies a load across the transducer. Loading of the transducer can significantly undermine the effectiveness of this circuit because it interferes with the transmit signal induced in the transducer from an acoustical voice input. In a typical microphone, the signals induced from the user's voice are quite small-on the order of 10 mV. Any loading of the transducer draws away the energy of the induced signal. To deal with these losses, the circuitry for processing the transmit signal can amplify the small voice signals, but if there is any feedback of the receive signal to the amplifier in the transmit circuitry, the feedback problem highlighted above becomes even worse.

SUMMARY OF THE INVENTION

The invention provides circuits that support a bidirectional signal path for simultaneous transmit and receive signals at one port while maintaining separation between the transmit and receive signals at their respective ports. In telephone terminology, a port corresponds to a pair of wires. Thus, the invention provides an interface between a two wire and a four wire configuration. This feature allows the circuits to support full duplex communication while maintaining a loop gain of less than one to address feedback problems. To accomplish this, the circuits employ amplifiers arranged in either a bilateral T hybrid or balanced impedance configuration.

While suitable for a variety of applications, one main application for the invention is in telephone devices. Within a telephone device, the invention can be used as a transducer interface and as a telephone line interconnect circuit. In a transducer interface, the invention provides a bi-directional signal interface to a transducer that acts as both a speaker/ear phone and a microphone. In a telephone line interconnect, the invention provides a bi-directional signal interface for simultaneously transmitting signals to and receiving signals from a telephone line. The transducer interface circuit drives a receive signal onto a transducer to create audio output while simultaneously generating a transmit signal from audio input to the transducer. The telephone line interconnect circuit drives a transmit signal through a transformer to send the transmit signal to a telephone line while simultaneously transferring a receive signal from the telephone line. In both applications, the circuits provide a bidirectional signal path (simultaneous transmit and receive signals) at one port and achieve separation of the transmit and receive signals being delivered to their respective ports.

One aspect of the invention is a bilateral T hybrid circuit configuration. The bilateral T hybrid includes two op amps, with the inverting terminal of one connected to the non-inverting input of the other. This node between the two op amps provides a T connect on, which carries a combined outgoing and incoming signal. One of the op amps is configured to receive a first input signal at its non-inverting input. Through the current mirror effect, this first input signal appears at the inverting input as well and represents the outgoing signal component at the T connection. A second input signal, entering the circuit at the T connection, represents the incoming signal.

The bilateral T hybrid uses a differential amplifier capable of reducing the outgoing signal and increasing the incoming signal. The first and second op amps each generate a common mode signal component corresponding to the outgoing signal. Since this signal appears as common mode, it can be canceled with the differential amplifier. A signal component corresponding to the incoming signal does not appear as common mode at the output of the amplifiers, and as such, is not canceled by the differential amplifier. In fact, the incoming signal can be applied to the op amps so that the signal components corresponding to the incoming signal are 180 degrees out of phase at the output of the op amps. Since the differential amplifier sums the components that are 180 degrees out of phase, the incoming signal is increased by the differential amplifier. In sum, the bilateral T hybrid supports a bi-directional signal flow at the T connection, yet provides an output signal with separation between the signal components corresponding to the outgoing and incoming signals.

Another aspect of the invention is a balanced impedance configuration. In one implementation, a pair of op amps are coupled together at their non-inverting inputs. These op-amps are arranged in a voltage fed-current feedback configuration. A first input signal, representing an incoming signal enters at the common node interconnecting the op amps. It appears in common mode at the output of the op amps, and thus, can be canceled by a differential amplifier. Due to the current feedback configuration, the incoming signal is transferred, virtually without loading, to a bi-directional device coupled in the feedback path of an op amp (either one or both of the op amps). A second input signal enters the circuit at the bi-directional device and is not in common mode at the output of the op amps. Thus, the output signal corresponding to the second input is not canceled in the differential amplifier.

In a telephone line interconnect, the bi-directional device can be a transformer that links the circuit to a telephone line. In this application, the transformer transfers an incoming receive signal from the telephone line to the circuit, and the circuit transfers an outgoing transmit signal through the transformer to the telephone line. In a transducer interface, the bidirectional device can be a transducer, such as an ear phone or speaker that acts as both an audio output device and an input device. In this application, the transducer generates the incoming transmit signal from audio input, and the circuit transfers an outgoing receive signal to the transducer, where it is converted to audio output.

Another aspect of the invention is the telephone line interface in the telephone line interconnect circuit. The telephone line interface includes a simulated inductor to regulate the current flow from the telephone line. The interface can also include an isolator circuit that opens the transmit signal path to the telephone line when the current in the phone line drops below a threshold or drops to zero. To prevent feedback or howl in a telephone device, the loop gain of the feedback path of the transmit and receive signals must be less than one. The isolator circuit addresses this problem by ensuring that the transmit signal path is open when the hook switch of the phone is open.

The circuits summarized above have a number of advantages. When used in a transducer interface, they support full duplex communication through a signal transducer. The circuits are effective as a transducer interface because they drive the transducer to create audio output with substantially no loading to the transducer. Since, in essence, the transducer is not loaded, it can act as a microphone to generate a transmit signal from audio input. In addition, the circuit addresses the problem of feedback by substantially canceling the receive signal component from the transmit signal path. When used in a telephone line interconnect, the circuits are useful as an interface because they provide a full duplex signal interconnect that combines the transmit with the receive signal on the telephone line while maintaining a greater separation between the transmit and receive signals than that of conventional telephone hybrid circuits or resistive-capacitive cancellation circuits.

Further advantages and features of the invention will become apparent with reference to the following detailed description and accompanying drawings.

BRIEF DESCRIPTION OF THE DRAWINGS

FIG. 11 is a schematic diagram illustrating another telephone line interconnect that employs a balanced impedance configuration.

FIG. 12 illustrates a schematic diagram of a transducer interface that uses a bilateral T hybrid.

DETAILED DESCRIPTION

The following description details several implementations of full duplex communication circuits. In telephone terminology, these full duplex circuits can provide a bi-directional "2-wire" signal path for simultaneous Tx and Rx signals and also provide two separate unidirectional signal paths for Tx and Rx signals (2 wires for the Tx signal and 2 wires for the Rx signal=4 wires). This type of circuit is sometimes referred to as a 2-wire to 4-wire circuit or "hybrid." In the case of conventional telephone lines, the telephone line provides a two-wire bi-directional signal path.

The full duplex circuits described below are used as transducer interfaces and telephone line interfaces. As a transducer interface, the circuit provides a bi-directional signal path at a transducer port and two separate unidirectional signal paths for incoming Rx signals and outgoing Tx signals at respective Rx and Tx ports.

As a telephone line interface, the circuit provides a bi-directional signal path at the telephone line and two separate unidirectional signal paths for the incoming Rx signal from the telephone line and the outgoing Tx signal from the telephone device, respectively.

It is important to note that the circuit can be used in a variety of communication applications. The circuit can be used in wireless telephone devices as well as special purpose communication devices (e.g., intercoms). In some applications, the circuit is used as a transducer interface but is not needed as a telephone line interface. In wireless communication devices, for example, the Tx and Rx signal paths are kept separate, and thus, a 4-wire to 2-wire hybrid is not necessary to transmit and receive signals from the communication device.

Transducer Interfaces

Figure 1:
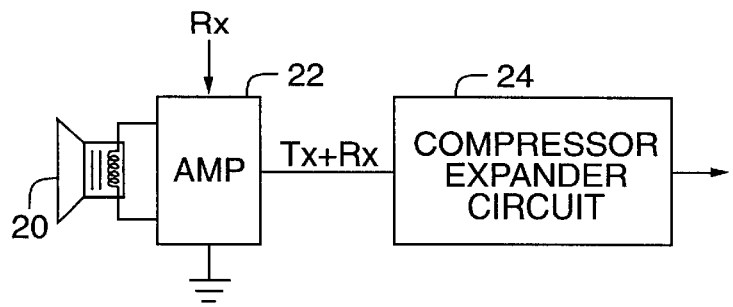
FIG. 1 is a general block diagram illustrating an implementation of a full duplex audio communication circuit.

FIG. 1 is a general block diagram illustrating an implementation of a full duplex audio communication circuit. The circuit includes a single transducer 20, an amplifier 22 coupled to the transducer, and a compressor-expander circuit 24 coupled to the output of the amplifier. The amplifier 22 receives an electrical input signal representing audio input (the receive signal Rx) and transfers it to the transducer 20, which then converts the receive signal into audio output. The transducer 20 also converts audio input, such as a user's voice, to an electrical transmit signal (the transmit signal Tx). Thus, the transducer 20 acts as both a microphone for converting audio input to an electrical transmit signal and a speaker for converting the electrical signal received from an external source into audio output. Note that there is no acoustical feedback path because the speaker and microphone are implemented within a single transducer. This avoids the need for electronically controlled attenuators to reduce the effects of acoustical feedback.

Since the transducer simultaneously receives the Rx signal and generates the Tx signal, there is a combined transmit and receive signal (Tx+Rx) at the output of the transducer 20. The amplifier 22 communicates this combined signal to the compressor-expander circuit 24. The compressor-expander circuit 24 takes the combined signal and simultaneously compresses the Rx signal and expands (increases) the Tx signal. Preferably, the compressor-expander circuit 24 is a logarithmic compressor-expander, which logarithmically expands the Tx signal and compresses the Rx signal. The Tx signal induced in the transducer 20 is typically quite small (e.g., about 3 mV) relative to the Rx signal applied to the transducer (which is about 300 mV). The compressor-expander is designed to compress signals in one voltage range and expand signals in another voltage range. Here, the objective is to send the Tx signal and substantially cancel the Rx signal to prevent feedback. To accomplish this, the compressor-expander is designed to compress signals above a threshold voltage level and expand signals below a threshold level. By compressing and expanding different parts of the signal simultaneously, the compressor-expander circuit 24 can make the Tx signal substantially larger and the Rx signal substantially smaller, and thus, reduce the difference between the transmit and receive signals.

The communication circuit shown here is "full duplex" because it simultaneously transmits and receives audio communication signals. When implemented in a phone handset or intercom, for example, the parties on each end of the line can simultaneously speak and hear each other's voices.

One significant advantage of this implementation is that the amplifier 22 avoids loading the transducer 20. The amplifier 22 is designed to drive the transducer 20 with minimal loss of the receive and transmit signals. To obtain the best performance, the receive signal should be applied to the transducer with minimal loading. Any loading of the transducer will lead to the loss of a portion of the transmit signal, which can seriously degrade performance especially because the transmit signal is typically quite small relative to the receive signal. In addition, the transmit signal should be generated without creating a loss of the receive signal in the transducer. One way to avoid having the transmit signal interfere with the receive signal is to place an impedance (a shunt) between the transducer and the source of the receive signal. This shunting of the transducer is undesirable because it causes loss of a portion of the receive signal. In this implementation, the amplifier 22 is connected to the transducer 20 to prevent both loading and shunting the transducer. This amplifier 22, therefore, is able to transfer the Tx signal with negligible loss, and is also able to apply the Rx signal to the transducer 20 with negligible loss.

Figure 2:
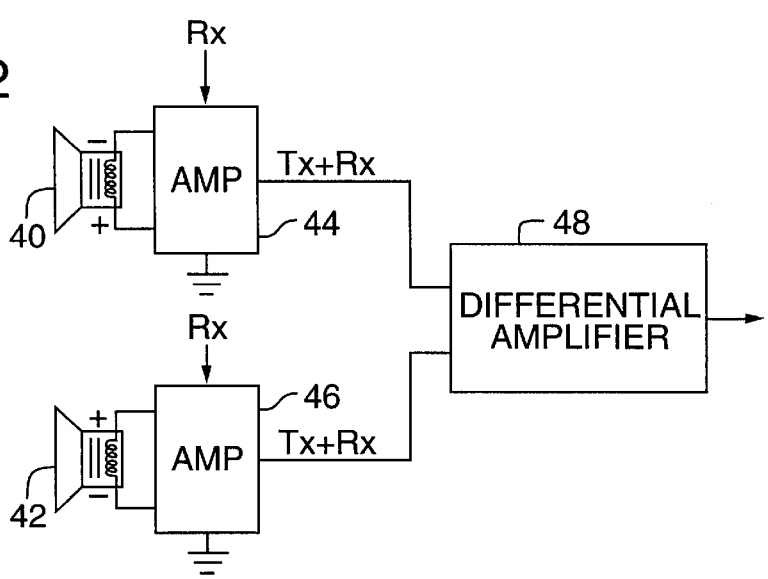
FIG. 2 is a general block diagram illustrating an alternative implementation of the audio communication circuit.

FIG. 2 is a diagram illustrating an alternative implementation of the audio communication circuit for conditions in which the signal level differences between the Tx and Rx signals are smaller (i.e. closer to being at the same level). This circuit includes two matched input stages, each including a transducer 40, 42 and an amplifier 44,46. Each of the input stages operates as described above in FIG. 1. Note, however, that the transducers 40, 42 are connected with opposite polarity with respect to each other so that the transmit signals in each input stage are approximately 180 degrees out of phase with each other. The impedance of the input stages is balanced so that the receive signals on each side are substantially equal in magnitude and in phase, and the transmit signals are substantially equal in magnitude but 180 degrees out of phase.

The circuit also includes a differential amplifier 48, which receives the combined transmit and receive signals as input and simultaneously adds the transmit signals and cancels the receive signals. Ideally, the output of the differential amplifier is proportional to the difference between the two input signals. Since the receive signals are substantially in phase, they should cancel each other. The extent to which the receive signals cancel each other depends on the matching of the input stages. Ideally, the impedances of the input stages are matched; however, in practice, it is difficult to achieve a perfect balance due to variations in the devices. Therefore, the receive signal will be substantially canceled at the output of the differential amplifier 48 if the input stages are matched, but not entirely canceled. It is also important to note that the impedance of the source of the receive signals can and often does fluctuate, and this can lead to phase differences in the impedance in each input stage.

It should be noted that it is not necessary to use a transducer on each side to achieve canceling of the receive signal using the differential amplifier. One of the transducers can be replaced by matching impedance device such as an inductor or RLC circuit that has the same impedance characteristics as the transducer. When a matching impedance device is used in place of a transducer, the side without the transducer obviously does not generate a transmit signal, but it is coupled to the source of the receive signal and behaves similarly to the other side of the differential configuration. The differential amplifier 48 substantially cancels the receive signals from each side and amplifies the transmit signal from the side with the transducer.

While each input stage in the differential configuration does not require a transducer, there are some advantages to using the same type of transducer in each input stage. One advantage is that the user can experiences more realism and presence. For example, in implementations where the matching transducers are earphones in each ear, the two earphones allow the user to hear audio output in both ears. If the transducers are implemented as speakers, such as in a desktop speaker phone, the speakers can be arranged to increase the audio output. The transmit signal output from the circuit is greater because the differential amplifier adds signals with opposite polarity at each input, approximately doubling the transmit signal. In addition, it is easier to achieve impedance and phase matching by using the same model of transducer on each side.

In general, this circuit configuration has a similar effect as the circuit in FIG. 1 in that it simultaneously increases the transmit signal while reducing the receive signal. However, in cases where the separation between the Tx and Rx signals is substantial, it is necessary to use a combination of both a compressor-expander and a differential amplifier to cancel the Rx signal in the combined Tx-Rx signal more effectively. The Tx signal induced in the transducer by voice input is much less than the Rx signal received from a standard telephone line. The compressor-expander reduces this separation between the Tx and Rx signals so that the differential amplifier is more effective in canceling the common mode Rx signals relative to the Tx signal.

Figure 3:
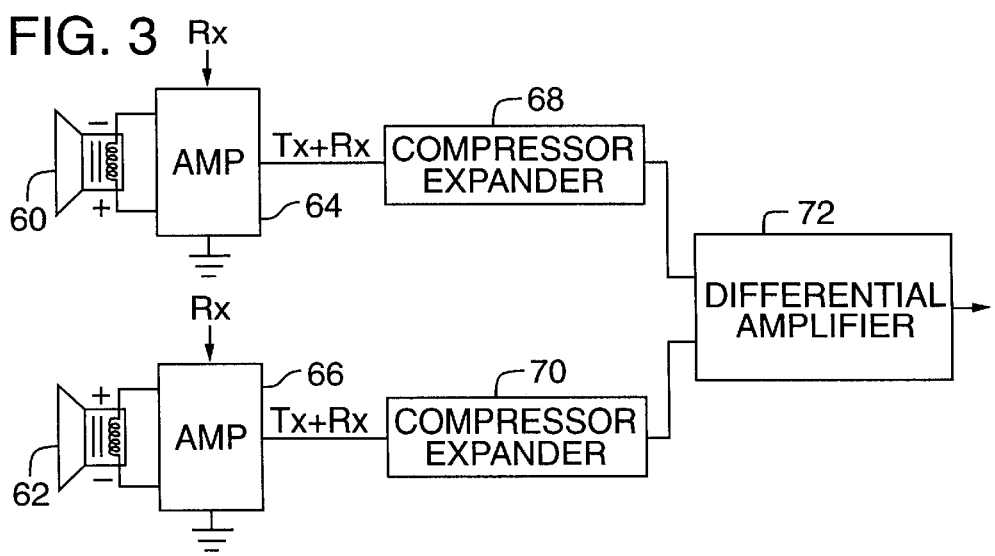
FIG. 3 is a general block diagram illustrating another alternative implementation of the audio communication circuit.

FIG. 3 is a block diagram illustrating another alternative implementation of the audio communication circuit. This circuit combines the features of the circuits in FIGS. 1 and 2 in that it uses both a differential amplifier and compressor-expanders to simultaneously compress the receive signal and increase transmit signal. The differential configuration in this circuit includes two input stages with matching impedance. The input stage on each side includes a transducer (60, 62) and an amplifier (64, 66). These components operate in the same fashion as the input stages shown in FIG. 2, and require no further elaboration here. Each side of the differential configuration also includes a compressor-expander (68, 70), which simultaneously compresses the receive signal and expands the transmit signal. The differential amplifier 72 receives a combined transmit and receive signal (Tx+Rx) from each side, cancels the receive signals against each other, and adds the transmit signals.

The circuit in FIG. 3 provides better performance than the circuits in FIGS. 1 and 2 because the differential configuration and compressor-expanders are combined to provide better cancellation of the receive signal and amplification of the transmit signal. As in the circuit of FIG. 2, it is preferable but not necessary to have transducers on each side. One side can be replaced with a matching impedance device. In this case, the side with the matching impedance device has a compressor in place of a compressor-expander because there is no transmit signal generated on this side.

Each of the circuits in FIGS. 1–3 include an audio processing circuit coupled to a transducer for receiving a combined signal, including Tx and Rx signal components, and for simultaneously expanding the Tx signal component and compressing the Rx signal component. The degree to which the audio processing circuit is capable of producing a Tx signal greater than the Rx signal, while substantially canceling the Rx signal, depends on the relative levels of the Tx and Rx signals at the transducer as well as the specific configuration of the audio processing circuit. In FIG. 1, the audio processing circuit comprises the compressor-expander circuit 24, which is particularly effective in reducing the difference between the Tx and Rx signals when the Tx signal is significantly smaller than the Rx signal. However, a compressor-expander by itself is not sufficient to make the Tx signal larger than the Rx signal and effectively cancel the Rx signal because the Tx signal produced in the transducer is typically quite small.

In FIG. 2, the audio processing circuit comprises the differential amplifier 48, which is particularly effective in canceling the Rx signal relative to the Tx signal when the two input stages of the differential amplifier are well-matched and the separation between the Tx and Rx signals is less significant. However, the differential amplifier alone will not be particularly effective unless the Tx and Rx signal levels are closer together.

Finally, in FIG. 3, the audio processing circuit comprises the combination of the compressor-expanders 68, 70 and the differential amplifier 72. The audio processing circuit in FIG. 3 more effectively cancels the Rx signal relative to the Tx signal because the compressor-expanders reduce the difference between the Tx and Rx signals first, and then the differential amplifier substantially cancels the common made Rx signals. More detailed implementations of the audio processing circuits in FIGS. 1–3 are described below.

Figure 4:
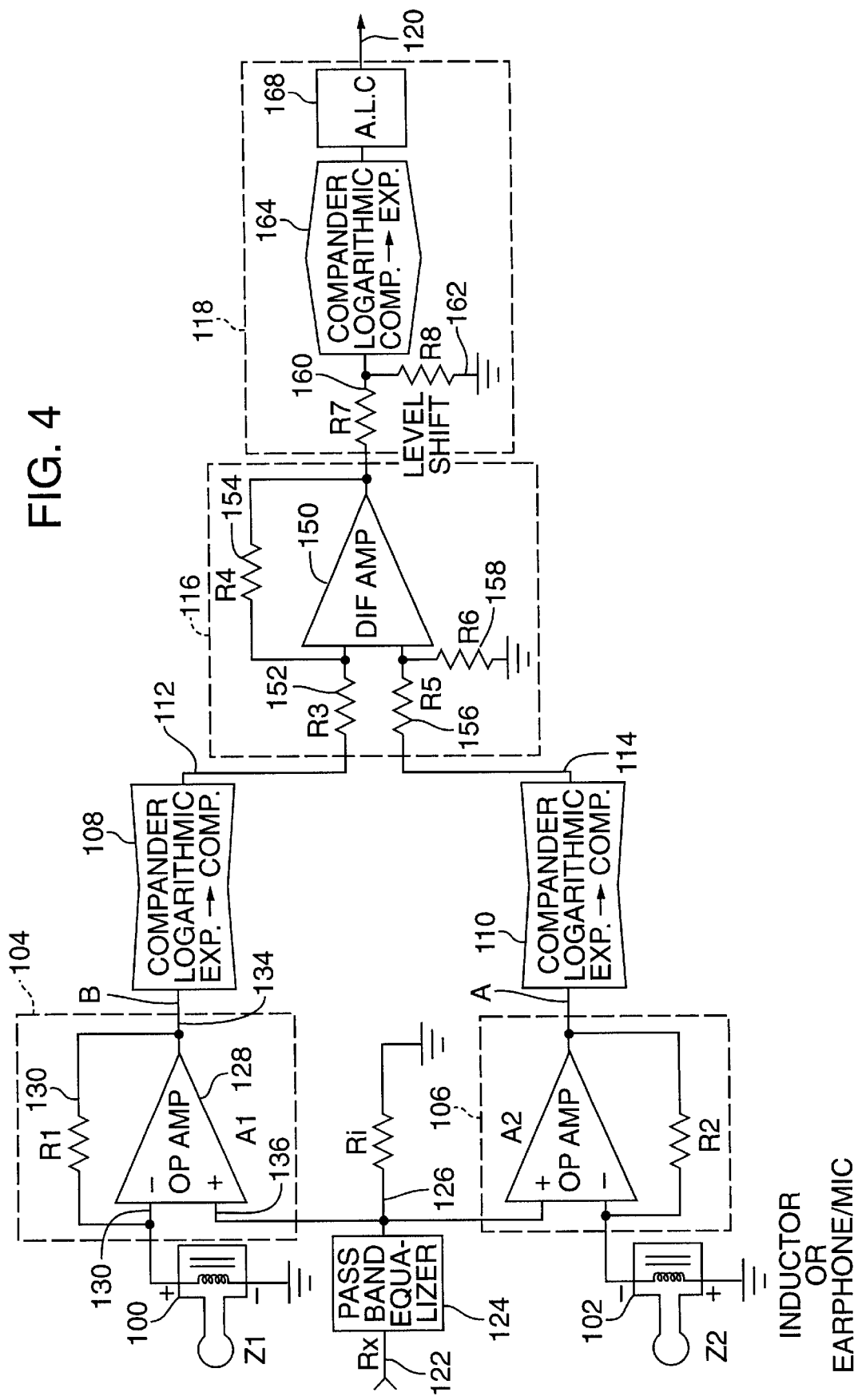
FIG. 4 is a schematic diagram illustrating a detailed implementation of a full duplex audio communication circuit.

FIG. 4 is a diagram illustrating a detailed implementation of a full duplex audio communication circuit. Like the circuit shown in FIG. 3, this circuit uses both a differential configuration and compressor-expanders to simultaneously expand the transmit signal from the transducer and decrease the receive signal from an external source. Each side of the differential configuration includes a transducer 100, 102, an amplifier 104, 106, and a compressor-expander 108, 110. The outputs 112, 114 of the compressor-expander on each side of the differential configuration are coupled to a differential amplifier circuit 116. The output of the differential amplifier circuit 116 is coupled to an output stage 118, which further expands the transmit signal, compresses the receive signal, and adjusts the voltage level of the output to a relatively uniform level. The output stage 118 generates a final transmit signal 120 as well as a substantially diminished receive signal which is at least 30 dB below the transmit signal level. By simultaneously compressing the receive signal and expanding the transmit signal, this circuit is achieves full duplex performance with minimal feedback.

The input receive signal 122 enters the circuit at a pass band equalizer 124. In this particular configuration, the pass band equalizer is implemented using a conventional two-pole pass band equalizer circuit. The pass band equalizer 124 equalizes the audio output at the transducer 100, 102. In particular, the frequency response of the receive signal tends to decrease at higher frequencies. To equalize the frequency response of the receive signal, the pass band equalizer has a reactive circuit that offsets and balances the frequency response of the receive signal.

The output 126 of the pass band equalizer 124 is applied to the amplifiers 104, 106 on each side of a differential configuration. FIG. 4 illustrates one way to apply the receive signal to the transducer using an amplifier without loading or shunting the transducer 100. In this implementation, the amplifier 104 includes an op amp 128 with a resistor R1 130 coupled across the inverting input 132 and the output of the op amp 134. Any of a variety of conventional op amp circuits can be used to implement the circuit, including but not limited to LM324 or TL084 op amps. This applies to op amps used in other embodiments as well. After passing through the pass band equalizer, the receive signal enters the non-inverting input 136 of the op amp. The inverting input 132 of the amplifier is coupled to the transducer 100, and the other side of the transducer is coupled to ground.

Since the current mirror bias of the op amp 128 acts like a current source, the op amp 128 receives the Rx signal at its non-inverting input and drives the Rx signal into the transducer 100 through its inverting input 132. The inverting input 132 is at virtual ground, meaning its voltage with respect to ground is approximately zero. Since the virtual ground cannot sink current, all of the input current from the Rx signal is forced through R1 130. The voltage gain of the amplifier 104, therefore, equals $-R1/Z1$. The negative sign denotes the phase inversion between the input and the output of the op amp. Also, because the inverting input is at a virtual ground, the input impedance of the amplifier is equal to Z1, the impedance of the transducer 100. Because of this unique method of driving the transducer 100 without loading or shunting it. the amplifier transfers the small electrical signal transduced from the audio input of the transducer (approximately 300 microvolts) with negligible loss to the output 134 of the op amp.

The amplifier 106 on the other side of the differential configuration has the same design as the amplifier 104 on the other side. However, the transducer 102 is connected to the amplifier 106 with an opposite polarity relative to the transducer 100 on the other side of the differential configuration. This enables the differential amplifier circuit 116 to approximately double the transmit signal received from each side of the differential configuration. It is important to note that, as explained above, the transducer 102 can be replaced with a device such as an inductor that matches the impedance of the transducer 100 on the other side of the differential configuration. When a matching impedance in place of the transducer 102, this side of the circuit includes only the receive signal, and therefore, the expander portion of the compressor-expander 110 is not necessary.

The transducers 100, 102 are depicted as earphones in FIG. 4 because this circuit is particularly well suited for a portable communication device with earphones. The audio communication circuit shown here can also use speakers, instead of earphones, for an application such as a desktop speaker phone. Whether the circuit is used in a portable device with earphones or as a desktop speaker phone, the transducers should preferably have a relatively high impedance so that they generate a larger Tx signal in response to voice input. Speakers with 100Ω and 600Ω impedance and other high impedance transducers are available from Kobitone Audio Co. and possibly other manufacturers. Kobitone Audio Co. also makes high impedance earphones. While I have referred to a specific type of transducer, it is important to emphasize that a number of alternative transducers including either earphones and speakers can be used to implement the invention. This applies to the implementation of FIG. 4 as well as the other implementations described and illustrated in this document.

In the context of speaker phone applications, one design consideration is the geometric orientation and polarity of the speakers. Consider a speaker phone application based on the circuit and FIG. 4. Since the speakers have opposite polarity, the acoustical outputs from each speaker can tend to cancel each other. One way to avoid this canceling is to place the speakers back to back (pointed in opposite different directions/180 degrees apart). This is an adequate solution for applications where the user is most often in front of the speaker phone, but it does tend to produce a "null" or dead zone along a plane perpendicular to the direction of both speakers and passing through the midpoint between the speakers.

Another solution is to connect the second speaker (102) between point A and ground in FIG. 4 with the same polarity as the first speaker (100). Since the speakers have the same polarity, this alternative design avoids the problem of having one speaker's output cancel the other speaker's output. However, when connected at point A at the output of the op amp in the amplifier 106, the transducer sees a load of the op amp's output impedance. This loading essentially prevents the transducer from producing a Tx signal on this side (point A) of the differential amplifier. However, this configuration does have the advantage of increasing the acoustical output because both transducers still convert the receive signal to an audio output signal. These issues regarding the positioning and polarity of speakers apply to other implementations described further below. However, the issue is not particularly relevant to applications using earphones since the audio output from each earphone is acoustically isolated from the other.

The output signals of the amplifiers 104, 106 are fed to identical compressor-expanders 108, 110 at each side of the differential configuration. In implementation shown here, the compressor-expanders are implemented using a conventional compander IC. Compander circuits are available from a number of manufacturers including Toko Semiconductor (Compander IC TK 1065IM), Sanyo Electric (LA8632M) and Motorola, Inc. (MC33110). The compressor-expanders are each configured to compress the larger receive signals and to expand the smaller transmit signals. After being amplified in the amplifiers 104, 106, the receive signals are fifteen to thirty times larger that the transmit signals generated from the audio input at the transducer. As such, the receive and transmit signals at the input of the compressor-expanders 108, 110 have approximately a 20:1 ratio. The compander in this implementation logarithmically compresses the receive signal and expands the transmit signal such that the ratio of the receive signal to transmit signals at its output is reduced to approximately 6:1.

The differential amplifier circuit 116 receives the output of the compressor-expanders (at nodes 112 and 114) and produces an output signal where the transmit signal is larger than the receive signal. The differential amplifier circuit 116 in this implementation comprises a differential amplifier 150 and resistors R3, R4, R5, and R6 (152–158). Resistors R3 and R5 are coupled between respective outputs of the compressor-expanders and the two inputs of the differential amplifier 150. Resistor R4 is coupled between one of the inputs and output of the differential amplifier, while resistor R6 is coupled between the other input and ground.

The larger receive signals are fed as common mode to the differential amplifier circuit which causes the net cancellation at the output to be approximately 30–40 dB below the original levels at the input. Being almost doubled by the compressor-expanders, the smaller transmit signals are further doubled in the differential amplifier since these signals are opposite in polarity with respect to each other. The differential amplifier output produces a combined transmit and receive signal where the transmit portion of the signal is 20–30 dB greater than the unwanted receive portion of the signal.

The output signal of the differential amplifier circuit 116 is fed to a level shift circuit in the output stage 118. Comprising resistors R7 and R8 160, 162, the level shift circuit is used in this implementation to adjust the level of the signal at the input of another compressor-expander 164. This particular compressor-expander 164 further expands the transmit signal and compresses the receive signal. Since the level of the transmit signal is greater than the receive signal at this point, the compressor expander 164 in the output stage is set to produce larger signals above a given threshold voltage level, and produce smaller signals below a given threshold level. The level shift circuit ensures that the input of the compressor-expander is at the proper level so that the compressor-expander operates properly.

In this particular implementation the compressor-expander 164 is also implemented using a conventional compander IC. This compander produces a greater separation between the Tx and Rx signals. In this part of the circuit, the compander increases the difference between Tx and Rx whereas, at the input stage, the compander decreases the difference between the Tx and Rx signals. As a result of this simultaneous compressing and expanding, the resulting output signal contains only a negligible receive signal, i.e., the transmit signal portion is approximately 35–40 dB greater than the receive signal portion. Therefore, any feedback of the receive signal to the output of the transmit channel is almost entirely eliminated.

The output stage 118 also includes an automatic level control circuit 168 which receives the output of the compressor-expander 164 and adjusts it to a relatively uniform output level. This automatic level control is particularly useful in telephone communication applications where the transmit signal should preferably be relatively uniform at about –5 dBm.

The full duplex communication circuit shown in FIG. 4 has a number of advantages. The unique configuration of the op amp relative to the transducer prevents any loading or shunting of the transducer. As a result, the amplifier transfers the small electrical signals transduced from audio input to its output with negligible loss. In addition, the prevents the receive signal from interfering with the transmit signal without shunting the receive signal, which would decrease the power of the receive signal and make it more difficult for the user to hear. Another advantage of this circuit is that it combines the use of compressor-expanders and a differential configuration to substantially cancel the receive signal from the output of the communication circuit. The companders and the differential amplifier simultaneously increases the transmit signal and compresses the receive signal such that feedback is almost entirely eliminated.

The full duplex communication circuit shown in FIG. 4 is particularly well suited for use in a head-set where the transducers act as both earphones and microphones. When the transducers are implemented in earphones, the circuit requires less power to create an audible signal because earphones are positioned in close proximity to the user's ear. The circuit can also be implemented in a speaker phone where the transducers are implemented in speakers that serve the dual function of converting the receive signal into audio output and transducing audio input into the transmit signal. However, when the circuit is implemented in a speaker phone, more power is needed to generate audio output at a sufficient level for the user to hear while standing away from the speaker. In addition, the transducer has to be capable of generating a sufficient transmit signal even when the audio input is originating from a source a few feet away.

One way to make the communication circuit shown in FIG. 4 operate more effectively higher power applications is to use additional transducers. The combined audio output from these transducers is easier to hear and the transmit signal generated in each of these transducers can be combined to create a larger composite transmit signal by utilizing more area of acoustical energy being imposed upon multiple transducers which maintain the same electrical gain. Note that using multiple transducers in this fashion increases the Tx signal without increasing the loop gain.

Figure 5:
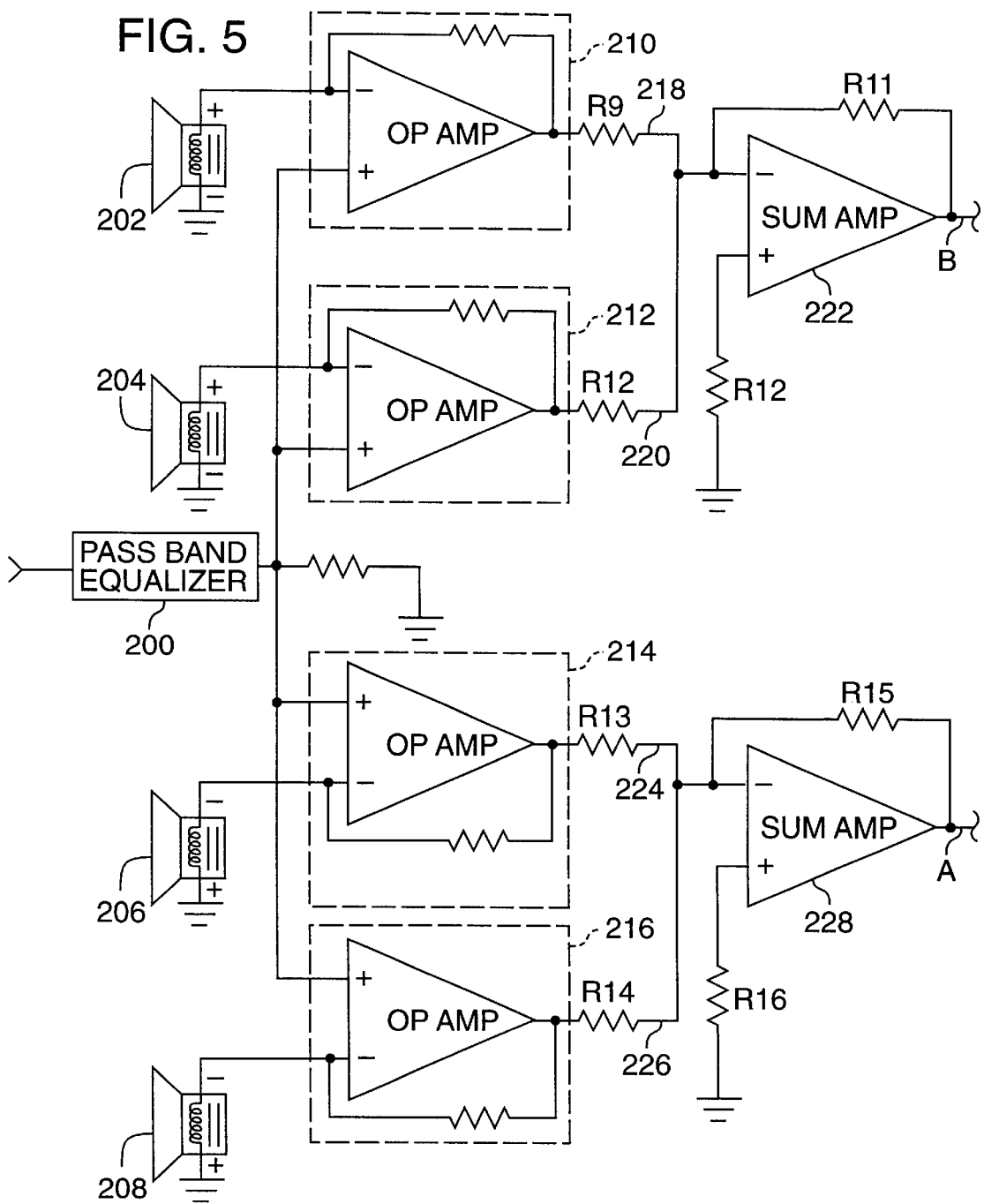
FIG. 5 is a schematic diagram illustrating how more than one transducer can be used on each side of a differential configuration similar to the one shown in FIG. 4 for higher power applications.

FIG. 5 is a schematic diagram illustrating how multiple dual purpose transducers can be combined for higher power applications. In this circuit, the input stages are similar to the input stages shown in FIG. 4, except that an additional transducer is connected in each side of the differential configuration. The receive signal from an external source enters the circuit at the pass band equalizer 200, which equalizes the frequency response of the signal. The receive signal is then fed to amplifiers 210, 212, 214, 216 having the same configuration as the amplifiers shown in FIG. 4.

Each transducer 202, 204, 206, 208 is coupled to a corresponding amplifier 210, 212, 214, 216 in the same way that the transducers are coupled to the amplifiers in the input stages shown in FIG. 4. On each side of the differential configuration, the output of the amplifiers (210, 212 for example) are coupled together through resistors at the output of the amplifier (R9 and R12; 218 and 220, for example). The combined output of the amplifiers is fed to the inverting input of a summing amplifier 222. The summing amplifier is comprised of an op amp with a first resistor R11 coupled across its inverting input and output, and another resistor R12 coupled between its non-inverting input and ground. The summing amplifier can combine multiple inputs at a time because of the virtual ground at the inverting input of the op amp. In this configuration, the summing amplifier generates an output equal to the sum of these multiple inputs, amplified by an amount equal to the gain of the summing amplifier.

The other side of the differential configuration is implemented in an identical manner. The output of the amplifiers 214, 216 on the other side of the differential configuration are coupled through resistors R13 and R14 to the inverting input of an op amp in the summing amplifier 228. Resistors R15 and R16 are coupled in the same manner as resistors R11 and R12 on the other side of the differential configuration.

The front end stage is designed to be coupled to a differential amplifier. Preferably, the remainder of the circuit and its operation are implemented as shown in FIG. 4. To simplify the drawing, the outputs of the summing amplifiers 222, and 228 are labeled with the letters A and B to correspond with nodes A and B in FIG. 4. The front end stage shown in FIG. 5 can replace the front end stage shown in FIG. 4 to the left of the nodes labeled A and B.

The use of multiple transducers as shown in FIG. 5 is advantageous for speaker phone applications because the output of each of the transducers is combined to produce a composite audio output that is easier to hear. In addition, the electrical signals transduced from audio input in each of the speakers can be combined to create a larger transmit signal. To add even more transducers, additional pairs of amplifiers and transducers can be combined as shown in FIG. 5. By employing multiple transducers, the circuit can generate increased acoustic power and can achieve increased acoustical geometrical sensitivity. Moreover, low power op amps (milliwatt) can effectively process the receive signal and the transmit signal generated in the transducer.

Figure 6:
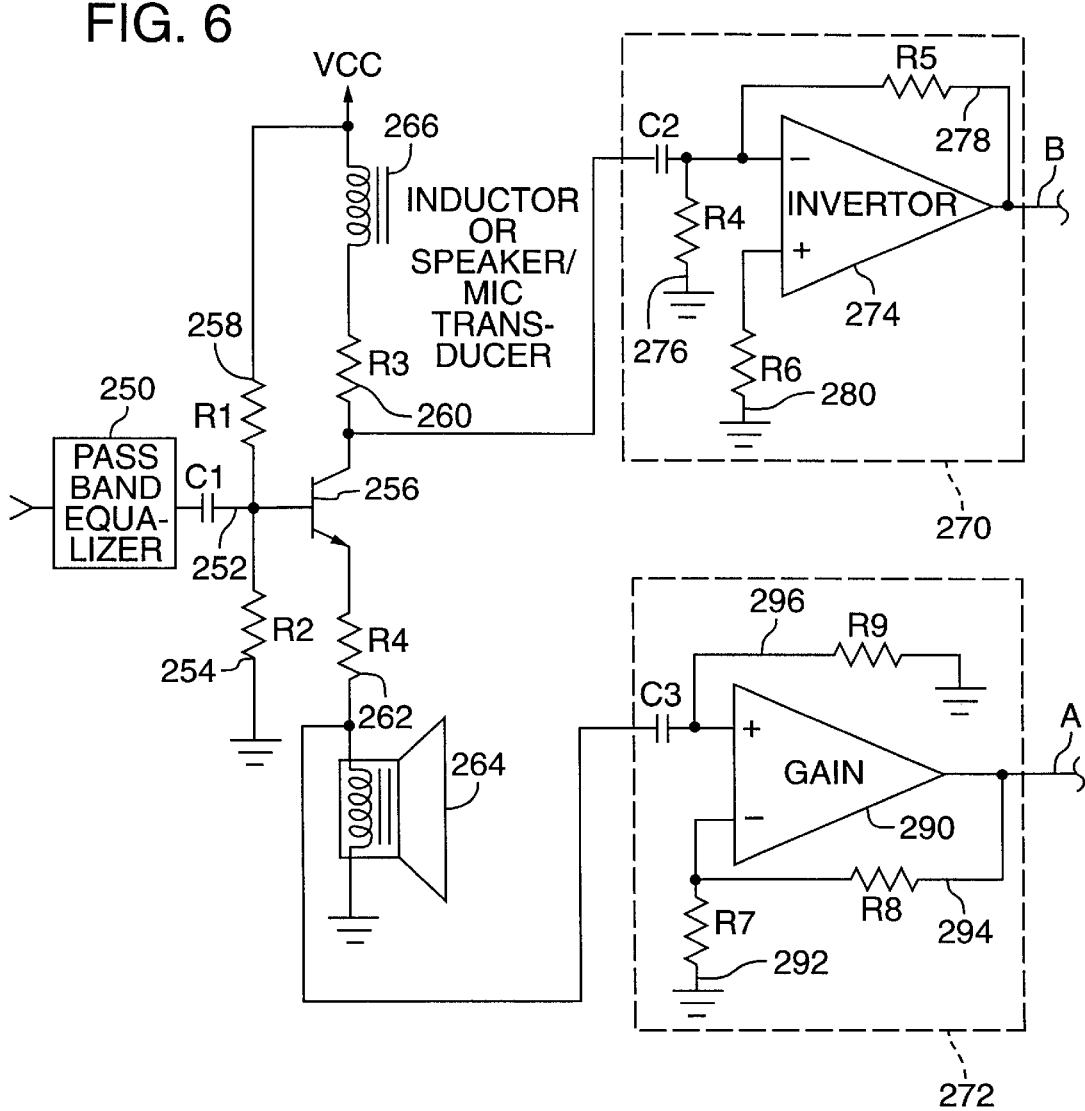
FIG. 6 is a schematic diagram illustrating another implementation of a full duplex audio communication circuit.

FIG. 6 is a schematic diagram illustrating another implementation of a full duplex audio communication circuit. This circuit has a front end utilizing a transistor to serve two functions: 1) it drives a transducer with the receive signal from a remote source; and 2) it amplifies the transmit signal generated in the transducer from audio input. This receive signal enters the circuit at a pass band equalizer 250, which balances the frequency response of the signal. The output of the pass band equalizer passes through a capacitor C1 252. Resistor R1 (258) and R2 (254) form a voltage divider that provides the necessary bias voltage for transistor 256. The capacitor couples the output of the pass band equalizer 250 to the input mode of a common emitter configuration of a bipolar junction transistor 256.

The transistor amplifier, in this implementation, includes an NPN transistor 256 and four resistors R1, R2, R3, and R4 (258, 254, 260, 262). The transistor amplifier is connected between a supply voltage, $V_{cc}$, and ground. Resistor R1 is coupled between the supply voltage and the base of a transistor, and resistor R2 is coupled between the base of the transistor and ground. The emitter is coupled through resistor R4 to the output of a transducer 264. On the collector side, the collector is coupled to a matching impedance device or transducer 266 through resistor R3. The transduce; or matching impedance device 266 at the collector is coupled between the supply voltage and resistor R3 260.

The impedance at the collector and emitter of the transistor is balanced so that the transistor can generate two corresponding outputs at the collector and emitter, where each output produces a receive signal that is out of phase with the other. The receive signals at each output are out of phase because the transistor acts like an invertor to the signal applied to in the input of a common emitter configuration. One of the outputs is inverted so that the resulting signals each include in phase receive signals . These signals can then be applied to differential amplifier to cancel the receive signal. The matching impedance in the collector can be implemented using either a transducer identical to the transducer 264 at the emitter or a device with matching impedance of the transducer 264.

The communication circuit shown in FIG. 6 uses the transistor as an amplifier in both a common emitter and a common base configuration. The current gain for both the common emitter and common collector configuration is equal to the beta of the transistor. Similarly, the voltage gain for both the common emitter and common base configuration is equal to the collector impedance divided by the emitter impedance. ($R_C/R'_E$). In the context of bipolar transistors, the term "common" refers to the terminal of the transistor that is common to both the input and output. Thus, in a common emitter configuration, the emitter terminal is common to both the input and output. Similarly, in a common base configuration, the base terminal is common to the input and output. In a common emitter configuration the input node is the base of the transistor, and the output node is the collector. In a common base configuration, the input node is the emitter of the transistor, and the output node is the collector.

The transistor amplifier shown in FIG. 6 amplifies the receive signal using the common base configuration. The transistor 256 amplifies the current of the receive signal applied to the base by an amount equal to the current gain of the transistor. The voltage across the transducer 264 is approximately equal to the receive signal voltage, less the, threshold voltage drop from the base to the emitter (approximately 0.7 volts) and the voltage drop across resistor R4.

The transducer 264 converts audio input into a transmit signal at the output of the transducer. This transmit signal is applied to the input of the transistor 256 in a common base configuration. As such, the transmit signal receives a voltage gain equal to the voltage gain for the common emitter configuration.

The amplifier configuration shown in FIG. 6 provides an effective way of driving the transducer with little loading. Any load applied to the transducer can reduce the transmit signal substantially since the transducer generates very small electrical signals from the audio input. Therefore, a significant advantage of this configuration is the way it drives the transducer without little loading. Another benefit of this configuration is that the transmit signal receives a significant amount of amplification due to the voltage gain of the amplifier.

The two outputs of the transistor amplifier in FIG. 6 are fed to opposite sides of a differential configuration. The output for one side of this differential configuration is taken from the collector of the transistor 256 and is applied to an inverter 270. The inverter inverts the transmit and receive signal portions so that: 1) the transmit signals on each side of the differential configuration are out of phase, and 2) the receive signals on each side are in phase. The receive signal at the collector of the transistor 256 is out of phase with the receive signal at the base of the transistor because the transistor acts as an inverter, as noted above. Therefore, in order to make the receive signal equal and in phase on each side of the differential configuration, the receive signal output at the collectors needs to be inverted.

The output for the other side of the differential configuration is taken at the output of the transducer 264. At this output node, the receive signal is in phase with the receive signal applied to the input of the transistor, but is out of phase with the output of the transistor at its collector. The transmit signal generated by the transducer 264 is in phase with the transmit signal at the output of the transistor.

The combined transmit and receive signal at the output of the transducer is applied to a linear amplifier 272 having a gain equal to the gain of the inverter 270. This linear amplifier 272 amplifies the combined transmit and receive signal and provides its output to the other side of the differential configuration.

In this implementation, the inverter 270 is implemented using an op amp and resistors R4, R5, and R6 (270, 278, and 280). The gain of the inverter is equal to R5/R4. The linear amplifier 272 is implemented similarly, except that the input is applied to the non-inverting input of an op amp 290. The linear amplifier 272, which includes an op amp 290, and resistors R7, R8, and R9 (292, 294, and 296), has a gain equal to R8/R7.

The outputs of the inverter 270 and linear amplifier 272 are applied to a differential amplifier which adds the transmit signal from each side together and substantially cancels the receive signal. To achieve better performance, the outputs of the inverter and linear amplifier are applied to identical compressor-expander circuits that simultaneously compress the receive signal and expand the transmit signal. One way to implement this is to apply the outputs of the inverter and linear amplifier to the compressor-expander 108, 110 shown in FIG. 4 at nodes labeled A and B. The remainder of the communication circuit can be implemented identically to the circuit shown in FIG. 4.

Figure 7:
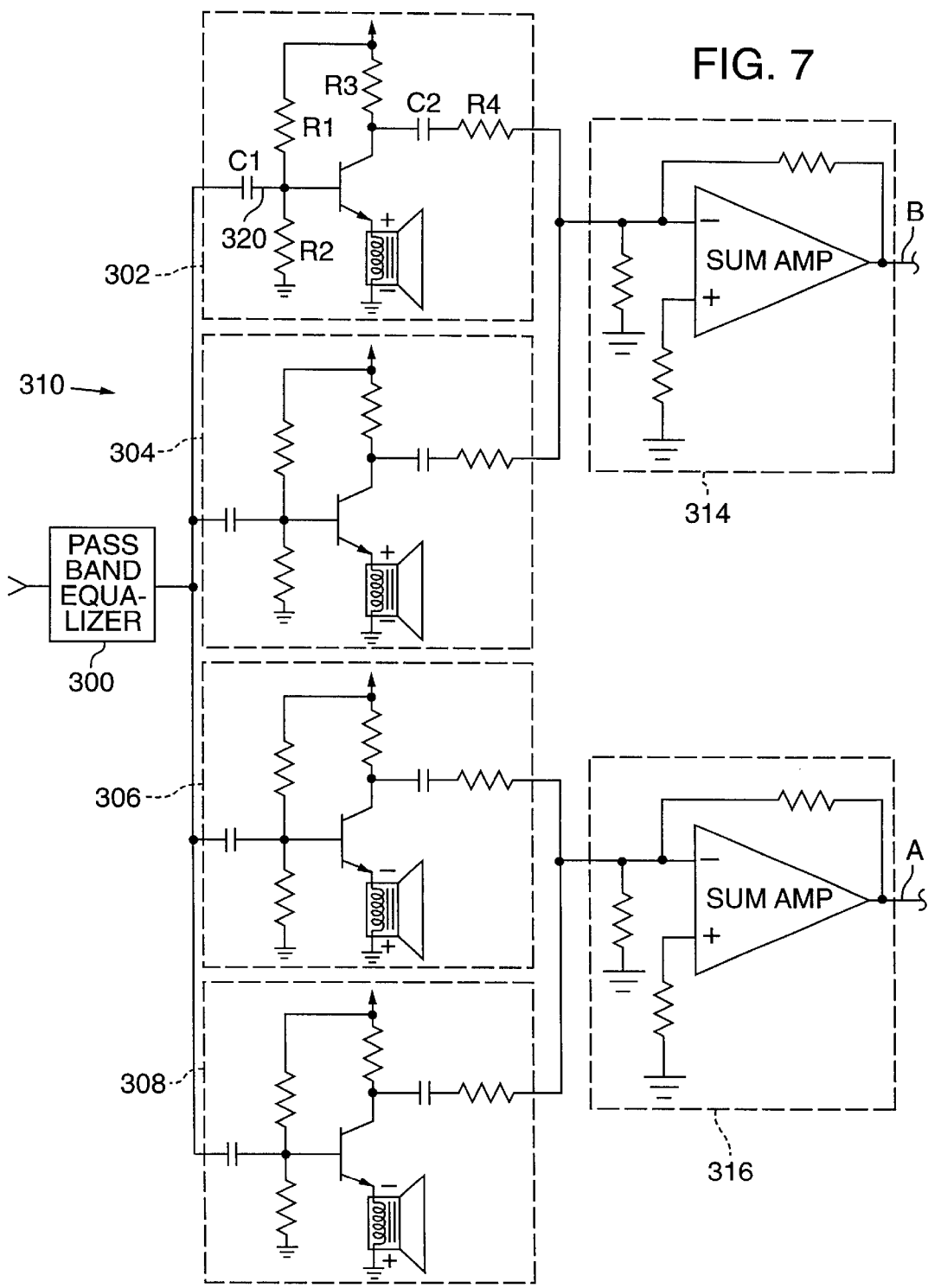
FIG. 7 is a schematic diagram illustrating how more than one transducer can be used on each side of a differential configuration similar to the one shown in FIG. 6 for higher power applications.

FIG. 7 is a schematic diagram illustrating how more than one transducer can be combined for larger power applications. In this circuit, each transducer is paired with a transistor amplifier using similar configuration to the one shown in FIG. 6. Rather than using a single transistor with a matching impedance at the collector and emitter, this circuit uses complementary pairs of input stages on each side of the differential configuration (for example, 302 is complementary to 306, and 304 is complementary to 308). Each input stage includes a transistor amplifier and a transducer coupled to the amplifier at the emitter of the transistor. Each input stage on one side of the configuration includes a complementary input stage on the other side of the configuration. Additional input stages can be added to each side of the differential configuration by using a summing amplifier 314, 316 to add the outputs of each input stage.

In this implementation, an input stage (e.g., 302) is connected in a common emitter configuration with respect to the receive signal and in a common base configuration with respect to the transmit signal induced in a transducer. The configuration and operation of an input stage is similar to the transistor amplifier in the input stage shown in FIG. 6. However, since there is a complementary front end stage on the other side of the differential configuration there is no need for a matching impedance device in the collector to balance the impedance of the transducer at the emitter.

The receive signal enters an input stage through capacitor C1 320 and passes to the input node of the base of the transistor. A first resistor R1 is coupled between $V_{CC}$ and the base, and a second resistor R2 is coupled between the base and ground. A third resistor is connected between $V_{CC}$ and the collector. The output of the transistor is provided at the collector, which is coupled to the input of a summing amplifier through capacitor C2 and resistor R4. The design of each of the other input stages is identical except that the input stages 306, and 308 on the other side of the differential configuration have a transducer coupled with the opposite polarity.

This full duplex circuit has similar advantageous to the circuit shown in FIG. 5 in that it can achieve greater acoustical geometric sensitivity and produce a higher power output. In addition, the use of multiple transducers also allows the circuit to generate a much larger transmit signal. The combination of transducers in a number of input stages also allows lower power transistors to be used as amplifiers.

Figure 8:
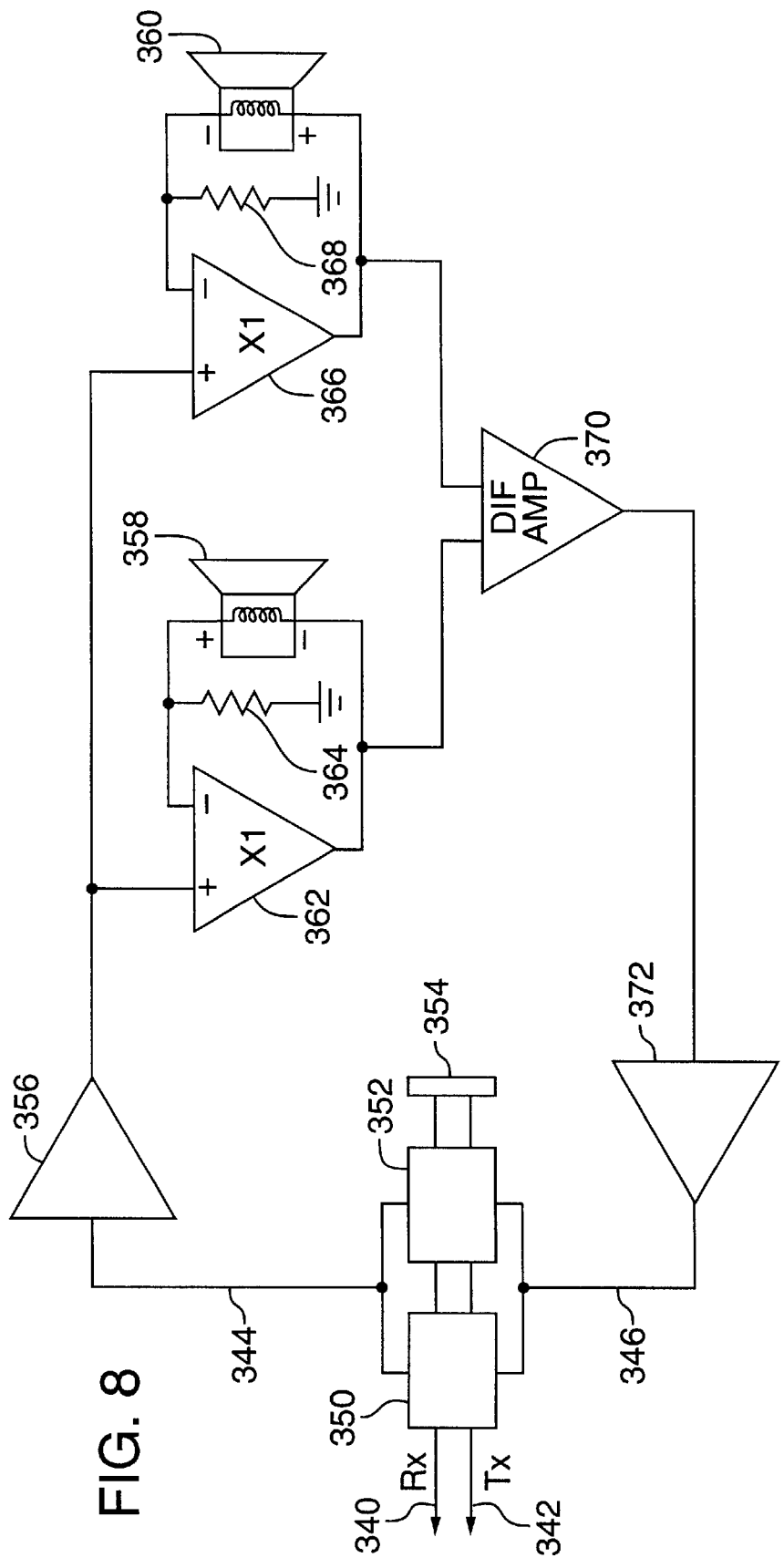
FIG. 8 is a schematic diagram illustrating another implementation of a full duplex audio communication circuit.

FIG. 8 is a schematic diagram illustrating another implementation of a full duplex audio communication circuit. This circuit uses a pair of conventional hybrid transformers 350, 352 to connect the receive side of the communication circuit to a receive wire 340 carrying an incoming signal from a remote source and to connect the transmit side 346 of the circuit to the transmit wire 342 carrying the outgoing signal. The transmit and receive wires simultaneously carry the transmit and receive signals. The pair of hybrids 350, 352 are coupled together and to a balancing impedance 354 so that the transmit and receive parts (344 and 346 respectively) of the communication circuit are substantially isolated from each Another. When the transmit signal is applied to the pair of hybrids, an equal but opposite signal is induced in each hybrid. As a result, the transmit signal is transferred to the transmit wire 342 but is substantially isolated from the receive side. Similarly, the receive signal entering via the receive wire 340 is transferred to the receive side 344 of the circuit but is substantially isolated from the transmit side 346.

The receive part of this circuit amplifies the receive signal and feeds it to a pair of input stages coupled in a differential configuration. The receive part of the circuit includes an amplifier 356 that amplifies the receive signal from the pair of hybrids and applies it to each of the input stages. In this particular implementation, the amplifier 356 is a generic op amp configured as a linear voltage amplifier. However, a variety of conventual amplifier circuitry can be used as well.

While not shown specifically in FIG. 8, it is possible to add an expander circuit, similar to the ones described above, between the hybrid transformers and the amplifier 356. The expander can be used to increase the separation between the Rx signal and the Tx signal (leaked from the Tx side through the hybrid transformers). In some applications, the incoming Rx signal can drop fairly low due to attenuation on the communication lines. At the same time, the Tx signal leaked to the Rx side may be higher due to the failure of the hybrids to provide sufficient isolation. Because of these issues, it can be useful to use a expander (e.g., one from the compander IC) to increase the separation between Rx and Tx by using it to expand the Rx signal.

Each input stage includes a transducer coupled to amplifier that transfers the receive signal to the transducer without loading it. The configuration of the input state shown in FIG. 8 demonstrates another way to drive the transducer with the receive signal while minimizing loading. It is important to note that this particular circuit for driving the transducer can also be used in place of the design shown in the input stages of FIGS. 4 and 5, for example. In the input stages shown in FIG. 8, the amplifiers are each implemented with an op amp 360, 362 with a resistor coupled between ground and the inverting input of the op amp. The receive signal is fed to the non-inverting input of the op amps, which are configured as voltage to current converters. The transducers are coupled between the output of the transducer and the inverting inputs of the op amps. The transducers are coupled with opposite polarity on each side of the differential configuration so that the transmit signal produced at the output of the input stages is equal but has opposite polarity. Conversely, the receive signal produced at the output of the input stages is roughly the same, assuming both sides of the differential configuration are balanced. The input stages each generate a combined signal including the transmit and receive signals, except the transmit signals are out of phase.

The combined signals from each input stage are fed into a differential amplifier 370, which substantially cancels the receive signal and approximately doubles the transmit signal. The differential amplifier communicates its output signal to an amplifier 372, which amplifies the signal further. The amplifier 372 is implemented using a generic op amp configured as a linear voltage amplifier. Since a 600 Ω transducer is used in this implementation, the amplifier 372 should be capable of driving a 600 Ω load. The signal at the output of the amplifier 372 primarily comprises an amplified transmit signal and a small portion of the receive signal.

The extent to which this circuit eliminates feedback depends on the isolation between the transmit and receive side using the hybrid transformers and the amount of cancellation of the receive signal achieved using the differential amplifier. Consider an example where the incoming signal on the receive wire is about 30 mV due to attenuation along the incoming wire and the outgoing signal on the transmit wire is approximately 300 mV. The table below describes the signal levels at various points in the circuit in a first case, where the receive side amplifier has a gain of 100, and in a second case, where the receive side amplifier has a gain of 50.

| Location in Circuit | Gain of 100 | Gain of 50 |
|---|---|---|
| Output of receive side amplifier 356 | Rx = 3 V | Rx = 1.5 V |
| Output of each input stage | Rx = 3 V; Tx = 15 mV | Rx = 1.5 V; Tx = 15 mV |
| Output of Dif. Amp 370 (assuming decrease of receive signal of 30 dB) | Rx = 100 mV; Tx = 30 mV | Rx = 50 mV; Tx = 30 mV |
| Output of transmit side amplifier 372 | Rx = 1 V; Tx = 300 mV | Rx = 0.5 V; Tx = 300 mV |
| Transmit Wire | Rx = 1 V; Tx = mV | Rx = 0.5 V; Tx = 300 mV |
| Feedback of Receive Signal to Transmit side (Assuming approximately 30 dB isolation) | Rx = 33 mV | Rx = 16.6 mV |

Note that in this circuit, there is some feedback and the feedback increases with the gain of the receive side amplifier. Also, the extent of the feedback depends in part on the isolation achieved using the pair of hybrid transformers with a balancing impedance. Thus, the performance will vary depending on how well the balancing impedance matches to the characteristic impedance of the communication line.

In some speaker phone applications, the communication circuit may need to produce a larger audio output. For example, if implemented in a speaker phone designed to be used in larger rooms, the user may want the speaker phone to produce a larger audio output of the Rx signal. This can present a problem in full duplex operation because increasing the gain on the Rx signal makes it more difficult to effectively reduce the Rx component from the Tx signal. One way to address this problem is to add additional transducers as microphones to create additional sources of the Tx signal. These new sources of the Tx signal can be added to together to effectively augment the final Tx signal output from the circuit.

One problem with this approach is that the additional microphones will receive both voice signals as input as well as part of the audio output from the dual-purpose speaker/microphones in the device. As such, the signals produced by the additional microphones will include both: 1) the voice input signal; and 2) a signal attributable to the output of the dual speaker/microphones. In order to effectively augment the Tx signal relative to the Rx signal, the circuit has to try to remove signals of type 2.

Figure 9:
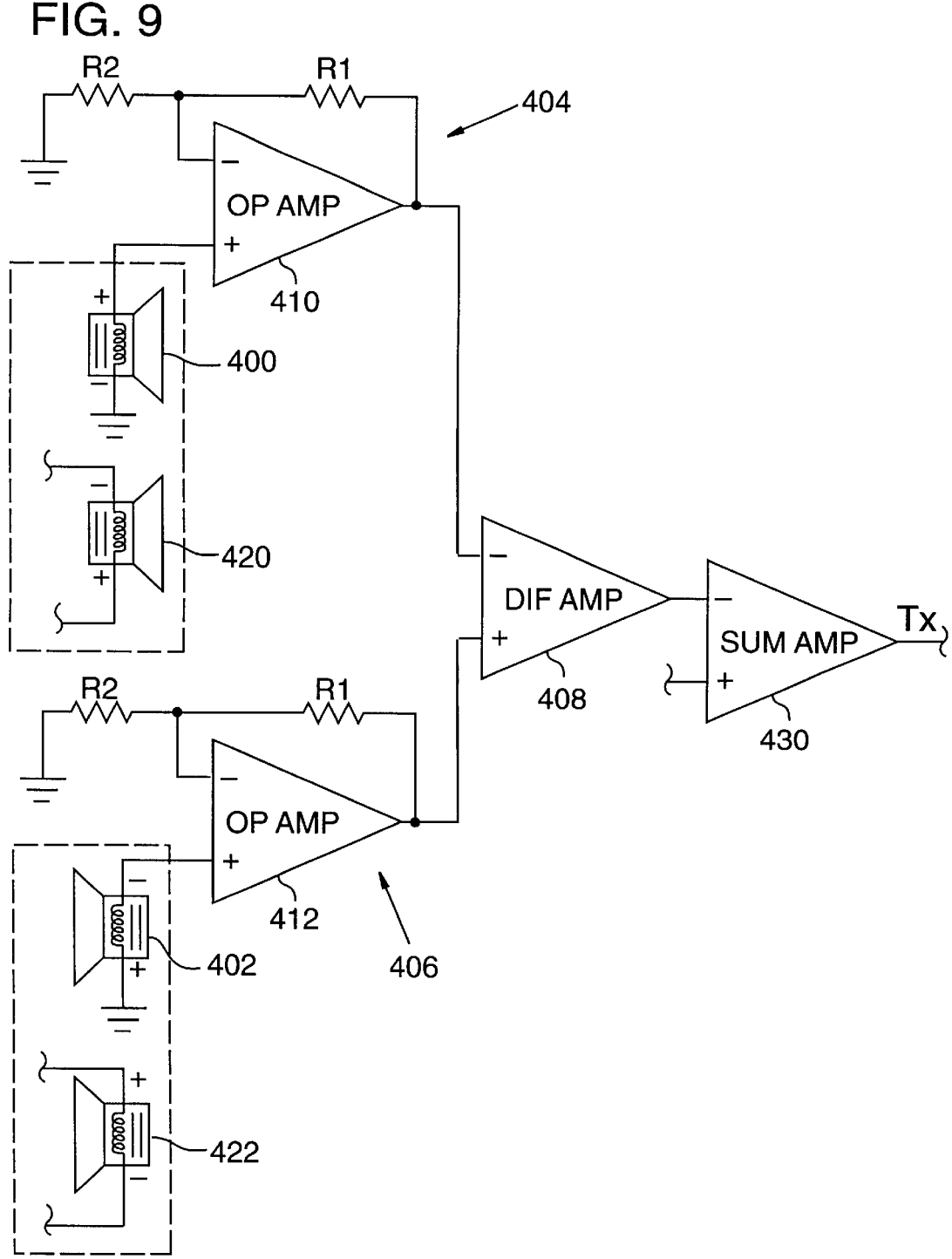
FIG. 9 is a schematic diagram illustrating a circuit for increasing the transmit signal in a full duplex communication device using additional microphones.

FIG. 9 is a schematic diagram illustrating one way to increase the Tx signal, while removing the signal attributable to the output of associated speaker/microphones. In this circuit, two additional microphones 400, 402 are coupled to respective input stages of a differential configuration. The input stages each comprise a linear amplifier 404, 406 that receives the signal produced in the microphone and transfers it to one of the inputs of a differential amplifier 408. Each linear amplifier is comprised of a conventional op amp 410, 412, resistor R1, coupled between the output of the op amp and its inverting input, and resistor R2 coupled between the inverting input and ground. The gain of the amplifier is a R1/R2, and therefore can serve as either a multiplier or a divider depending on the resistance values of R1 and R2.

Note that the microphones 400 and 402 are coupled with opposite polarity to their respective linear amplifiers. The voice input enters the microphones in phase, but is converted to voice signals that are approximately 180 degrees out of phase at the output of each microphone 400, 402. Acting as a subtractor, the differential amplifier 408 will nearly double the part of the input signal attributable to voice input.

Each of the microphones is paired with an associated speaker/microphone 420, 422 from another part of the circuit that has opposite polarity with respect to the other. Since the speaker/microphones have opposite polarity, the audio output of each speaker/microphones will be approximately 180 degrees out of phase with the other. One objective of this circuit arrangement is to remove the signal produced in each of the microphones attributable to the audio output of the associated speaker/microphone. As a result, the speaker/microphones 420, 422 should be paired with a microphone 400, 402 so that each microphone will take audio input that enters it at 180 degrees out of phase with the input to the other microphone and convert this input to electrical signals that are in phase. This enables the differential amplifier to remove, by subtraction, the input to the microphones 400, 402 attributable to the associated speaker/microphones 420,422.

For example, if this circuit were used with the circuit of FIG. 8, then microphone 400 would be paired with speaker/microphone 358 (420 in this diagram), and microphone 402 would be paired with speaker/microphone 360 (422 in this diagram). Part of the audio output of speaker/microphone 420 will enter the microphone 400, which will convert it into an electrical signal. Similarly, part of the audio output of speaker/microphone 422 will enter the microphone 402, which will convert it into an electrical signal. Since the microphones have opposite polarity, they will convert the audio input from the speaker/microphones 420, 422 (respectively) so that the resulting electric signals are substantially in phase. The differential amplifier 408 will then remove the common mode signal substantially.

Because of the relationship between the transducer outputs, the configuration of the microphones and speaker microphones are an important aspect of this design. A speaker/microphone 420 and its associated microphone 400 should preferably be positioned in the same direction. In addition, both pairs of speaker/microphone and microphones should be pointed away from each other. This is graphically depicted in FIG. 9, where transducers 400 and 420 point in the same direction, transducers 402 and 422 point in the same direction, and the pairs 400, 420 and 402, 422 point directly away from each other. This configuration tends to isolate the output of dual purpose transducer 420 from microphone 402 and the output of dual purpose transducer 422 from microphone 400.

One possible configuration that satisfies this criteria is a box with transducers 400, 420 in an over-under relationship facing out at one side of the box, and transducers 402, 422 in a similar over under relationship facing out at the opposite side of the box. Of course, there are other possible configurations that will achieve acceptable results. It is important to remember that the objective of this design is use additional inputs to increase the Tx signal, while providing a configuration where any unwanted input can be removed substantially.

To achieve an increase in the Tx signal, this circuit includes a summing amplifier 130, which adds the Tx signal contribution from the circuit in FIG. 9 to the Tx signal produced in another part of the circuit. In FIG. 8 for example, the Tx signal from the differential amplifier 370 can be summed with the Tx signal produced at the output of the differential amplifier 408 in FIG. 9. This same approach can also be used in other speaker phone devices based on the circuit design shown in FIG. 4.

While I have described implementations of the invention in detail, it is important to note that the scope of the invention is not limited to these specific implementations. The full duplex communication circuit can be implemented using a variety of different combinations of the novel circuit elements described above. For example, the circuits for applying the receive signal to the transducer without loading the transducer can be combined with the circuits for simultaneously compressing the receive signal and expanding the transmit signal in a variety of ways. While using a differential configuration in combination with compressor-expanders can improve performance by more effectively canceling the receive signal, these elements do not need to be used together if the Tx and Rx levels are closer together. As another example, a full duplex transducer can be coupled with a circuits for simultaneously compressing the receive signal and expanding the transmit signal without using amplifiers in the input stage to avoid loading the transducer. However, better performance can be achieved by minimizing loading to avoid losses of the transmit signal, as explained above.

Telephone Line Interconnect

Figure 10:
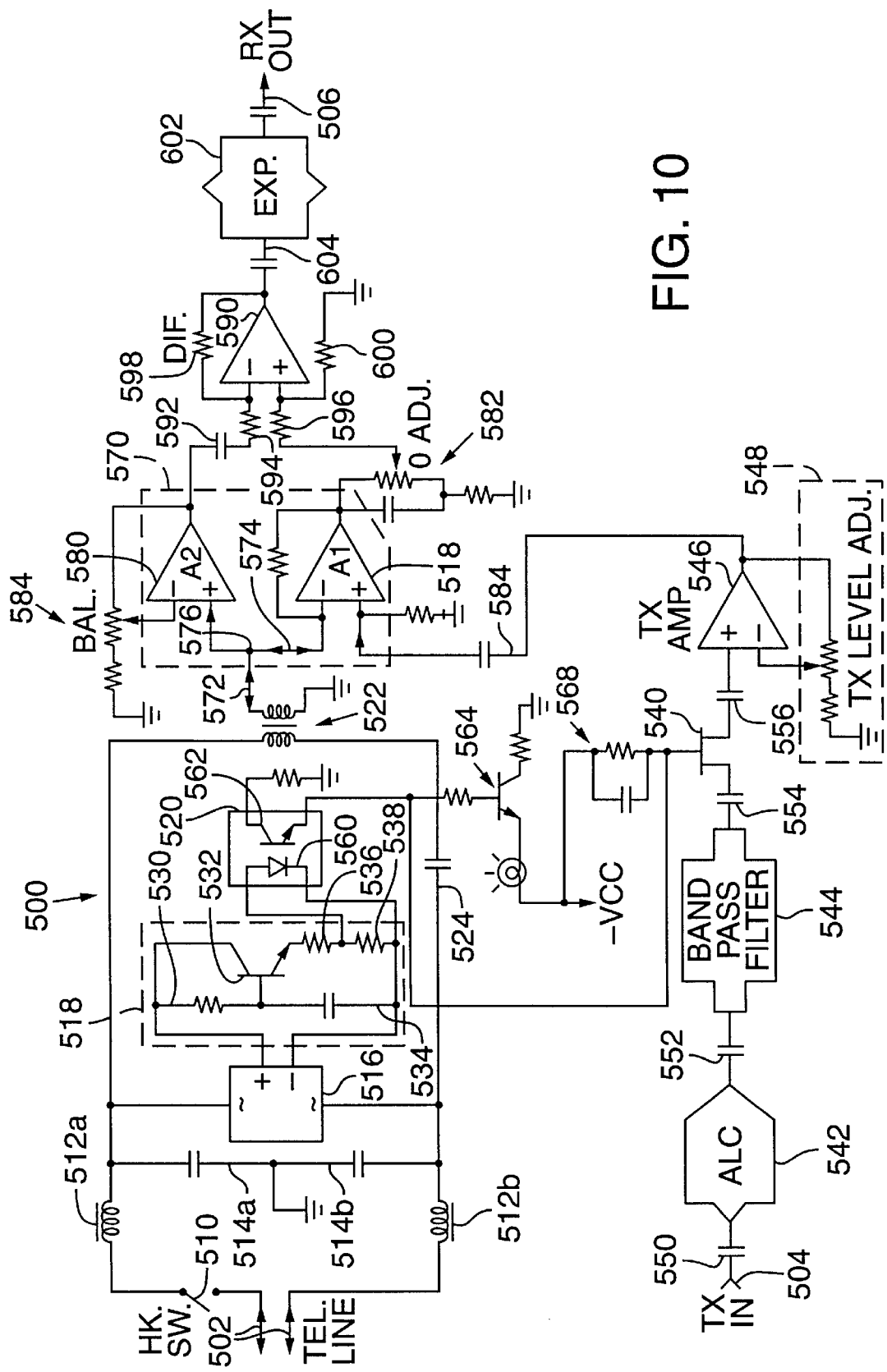
FIG. 10 is a schematic diagram of a telephone interconnect circuit that employs a bilateral T hybrid configuration.

A major application of the full duplex communication circuits described above is in the telephone industry. When used in telephone devices, these fall duplex communication circuits act as a transducer interface and are connected to the telephone line through a telephone line interconnect circuit. The circuits shown above are called transducer interfaces because they drive a transducer with the Rx signal to produce audio output and use the transducer to. convert audio input into the Tx signal. Another circuit, called the telephone line interconnect, is used to connect the Tx and Rx signals from the transducer interface to the phone line. FIGS. 10 and 11 illustrate alternative implementations of a telephone interconnect circuit.

FIG. 10 is a schematic diagram of a telephone interconnect circuit 500 that employs a bilateral T hybrid configuration. The telephone interconnect communicates Tx signals from the transducer interface to the telephone line 502, and it transfers Rx signals from the telephone line 502 to the transducer interface. The Rx input and Tx output terminals of the transducer interface are connected to the Tx input 504 and Rx output 506 terminals of the telephone interconnect, respectively. Tx signals generated in the transducer interface are transferred to the telephone line via the telephone line interconnect. Conversely, Rx signals from the telephone line are transferred to the transducer interface via the telephone line interconnect.

As shown in FIG. 10, the analog telephone line is connected to the telephone line interconnect 500 via a telephone line interface. This interface includes a conventional hook switch 510, inductors 512a–b, filters 514a–b, a rectifier 516, current regulator 518, opto-coupler 520, isolation transformer 522, and capacitor 524. The filters 514a–b, each comprising a capacitor connected between the signal path and ground, filter high frequency (RF) components of the telephone signal. The bridge rectifier 516 receives the filtered telephone signal and provides a consistent polarity to the current regulator 518. This ensures that the circuit will work in cases where the tip ring is reversed.

Serving as "a simulated inductor," the current regulator exhibits a low DC resistance and a very high AC impedance thus allowing nearly all of the voice signal to be transferred to the transformer 522 . Due to varying line lengths, the current in the telephone line can fluctuate and sometimes drop too low. To address this problem, the simulated inductor adjusts the load resistance to the telephone line so that a satisfactory loop current is maintained. The positive terminal of the rectifier 516 is connected to a resistor 530 and the collector of a bipolar transistor 532. The base of the transistor is connected to the resistor and to an AC shunting capacitor 534 (e.g., 10 $\mu$F). The emitter of the transistor is connected to a voltage divider, consisting of two resistors 536–538. The voltage signal at the node between these resistors in the voltage divide is applied to the input of the opto-isolator 520. The simulated inductor uses the AC shunting capacitor 534 to ensure that nearly all of the telephone signal is transferred to the isolation transformer 522.

The isolation transformer in the interconnect circuit acts as a repeater of the telephone signal. It is a standard transformer used in telephone devices and conforms to FCC regulations. It has an input impedance of about 600 ohms and an output impedance of 900 ohms. Through the magnetic coupling in the transformer coils, the isolation transformer transfers the outgoing Tx signal to the telephone line and transfers the incoming Rx signal to the Rx circuit in the telephone interconnect.

To prevent feedback or howl, the loop gain of the feedback path in the Rx and Tx circuits when connected to the telephone line must be less than one. The telephone line interface ensures that the loop gain remains less then one when the hook switch is open by operating a switch (FET 540) so that the transmit circuit is open when the hook switch is open. The transmit circuit includes an automatic level control (ALC) 542, band pass filter 544, Tx amplifier 546, and Tx level adjuster 548. The ALC, band pass filter, FET and Tx amp are interconnected via capacitors 550–556. When the LED 560 in the opto-coupler is active, it induces a signal in a phototransistor 562. A bipolar transistor 564 acts as a switch which turns on lamp 566 and drives the gate of the FET switch 540 via an RC network 568.

When the telephone line interconnect circuit is disconnected by opening the hook switch (on-off switch) or if the telephone line is physically disconnected, the opto-coupler, which derives its LED current from the telephone line, will cause the FET 540 to provide an open circuit in the Rx/Tx feedback path. This open circuit prevents a howling oscillation when the hook switch is off. When telephone line current flows through the LED, the FET 540 has a low resistance and completes a closed loop with an overall gain less than one.

The telephone line interface and transmit circuit are connected in a circuit arrangement called the bilateral T hybrid 570. The bilateral T hybrid provides bi-directional current flow to the telephone line as depicted by double arrows 572 and 574. Specifically, the telephone signal enters the bilateral T via the isolation transformer 522, and the transmit signal enters the bilateral T via the amplifier Al due to the current mirror effect of this amplifier. Thus, the receive signal from the telephone line and the transmit signal from the transmit circuit are combined at the T connection 576 of the bilateral T hybrid.

The bilateral T hybrid shown in FIG. 10 comprises amplifiers A1 and A2 (578, 580), each conventional op amps. The negative input of op amp A1 is connected to the positive input of op amp A2. An RC circuit 582 is connected between the output node of A1 and ground to compensate for the phase shift introduced by the isolation transformer 522 and the reactive components within the telephone line. To ensure that A1 and A2 are balanced, the gain of A2 is adjusted via variable resistor 584, connected between the output and negative input of A2.

The Tx signal from the Tx Amp 546 is fed to the positive (non-inverting) input of A1 via capacitor 584. Through the current mirror of A1, a Tx signal identical to the Tx signal at the positive input of A1 appears on the negative (inverting) input of A1. The Tx signal at the negative input of A1 is fed to the isolation transformer 522 and to the positive input of A2. A1 and A2 produce an output Tx signals that have the same polarity and are common mode. As such, they can be canceled by subtraction using a differential amplifier 590 as shown in FIG. 10.

Because of the virtual ground on the negative input of A1, the positive input of A2 sees the virtual ground of A1. Due to this virtual ground, the incoming Rx signal from the transformer 522 will appear only at the output of A1. As such, the Rx signal at the input of the differential amplifier does not appear in common mode, and there is no cancellation of the Rx signal at the output of the differential amplifier 590. In cases where the telephone signal is small, it is useful to use compressors as in FIG. 12 to improve separation between the Tx and Rx signals. In this configuration, a resistor can be inserted between node 576 and the inverting terminal of A1 so that Rx signals at each input of the differential amplifier will be 180 degrees out of phase. The differential amplifier will sum the Rx signals, and thus, provide a greater Rx signal at its output.

The differential amplifier 590 in FIG. 10 is implemented with a conventional op amp 590. The output from A2 is connected to the negative input of this op amp 590 via a capacitor 592 and resistor 594. The output of A1 is connected to the positive input of the op amp 590 via the RC network 582 and another resistor 596. In the differential amplifier configuration, a first resistor 598 is connected between the output of the op amp 590 and the negative input, and a second resistor 600 is connected between the positive input of the op amp and ground. The resistance of these resistors is set to be substantially equal.

By canceling the common mode Tx signal and passing the Rx signal, the bilateral T hybrid effectively separates the Tx signal from the Rx signal. To provide further separation, the telephone interconnect includes an expander-compressor circuit 602, connected to the output of the differential amplifier via a capacitor 604. The expander-compressor expands the larger Rx signal and compresses the smaller Tx signal in the same fashion as the compander IC in the output stage shown in FIG. 4 (compressor-expander 164 in FIG. 4).

FIG. 11 is a schematic diagram illustrating another telephone line interconnect that employs a balanced impedance configuration. The telephone line interconnect in FIG. 11 uses the same (or similar) telephone interface and transmit circuits as those shown in FIG. 10, so these parts of the telephone interconnect are omitted from FIG. 11.

The balanced impedance configuration in FIG. 11 includes two op amps 620, 622, with their positive terminals connected together at a common node 624. The op amps are each arranged in a voltage fed-current feedback configuration. In other words, each amplifier is fed with a voltage input signal and produces a current output signal that is fed back to an input of the amplifier via a feedback path. This configuration provides a high source impedance to the transformer so that there is substantially no loading on the transformer. This enables a small receive signal to be amplified without loss due to loading. The first op amp 620 feeds a current output back to the isolation transformer 626 and a shunt resistor 628 connected across the terminals of the transformer. The other op amp 622 feeds a current output back through another transformer 630 connected to an RC network 632 that simulates the impedance of the telephone line. The negative terminals of each op amp are connected to ground via a resistor 634, 636. One of these resistors is variable to balance the outputs of the two op amps. The common node 624 connecting the positive terminals of the op amps together is connected to ground via another resistor 638.

The Tx signal from the Tx amp is fed to the common node 624 via a capacitor 640 and provides in input voltage signal at the positive terminals of each of the op amps 620, 622. In response to this input Tx signal, the op amps produce Tx output signals that appear in common mode at their outputs. The extent to which these Tx output signals are matched depends on how well the impedance of the amplifier configurations are balanced. The common mode Tx signals are canceled by subtraction in a differential amplifier 650.

In contrast to the Tx signal, the Rx signal is not canceled in the differential amplifier because it does not appear in common mode. The op amp 620 connected to the isolation transformer receives both the Rx signal from the telephone line and the Tx signal from the Tx amplifier and produces a combined Tx and Rx signal. The Rx signal from the telephone line circuit is fed to the negative terminal of this op amp 620. The output of the op amp 620 is a combined Tx and Rx signal, which is fed to the positive input of the differential amplifier 650 and is also fed back to the telephone line interface. Since there is no Rx signal input to the other op amp 622, there is no Rx component at its output, nor at the negative input of the differential amplifier 650. Thus, the differential amplifier passes the Rx signal to its output.

As described above, the differential amplifier 650 in FIG. 11 cancels the common mode Tx signal and passes the Rx signal. The differential amplifier 650 comprises a conventional op amp 652, resistors 654, 656 coupled to the positive and negative inputs of the op amp, a resistor 658 connecting the negative input with the output of the op amp, and another resistor 660 connecting the positive input of the op amp to ground. The differential amplifier 650 receives the combined Tx and Rx signal from the op amp 620 via a capacitor 662 and resistor 656. It receives the Tx signal from op amp 622 via another capacitor 664. The differential amplifier substantially cancels the Tx signal and produces an Rx out signal through a capacitor 668, connected to the output of the op amp 652.

Relative to the telephone interconnect in FIG. 10, the balanced impedance configuration more accurately simulates the reactive component in the telephone line. As a result, the Tx signal output from each of the op amps is more evenly matched. This enables the differential amplifier to provide an improved cancellation of the Tx signal at its output. Note that if the differential amplifier sufficiently cancels the Tx signal, an expander-compressor circuit is not necessary at the output of the telephone interconnect.

Use of the Bilateral T Hybrid and the Balanced Impedance Configuration in a Transducer Interface The bilateral T hybrid of FIG. 10 and the balanced impedance configuration of FIG. 11 can also be used in a transducer interface circuit to provide a combined Tx/Rx signal at the transducer, yet maintain separation between the Tx and Rx signal components at the Tx and Rx terminals of a telephone line interconnect. Both of these configurations provide a bi-directional signal path for the combined Tx and Rx signal at one terminal while maintaining separation of the Tx and Rx signals at two other terminals. In a telephone interconnect, the bi-directional signal path is at the telephone line interface, and the objective of the interconnect is to separate the Tx signal sent to the telephone line from the Rx signal received from the telephone line. In the transducer interface, the bi-directional signal path is at the transducer (which acts as a speaker/ear phone and microphone) and the objective of the interface is to separate the Tx signal generated in the transducer from the Rx signal that drives the transducer.

The Bilateral T Hybrid Configuration in a Transducer Interface

FIG. 12 illustrates a schematic diagram of a transducer interface that uses a bilateral T hybrid. The bilateral T hybrid is connected to a transducer that acts as both an input and output transducer. It provides bidirectional current flow to and from the transducer and separates the Rx from the Tx signals.

The bilateral T hybrid circuit 680 in the transducer interface shown in FIG. 12 is the same as the bilateral T hybrid circuit shown in FIG. 10. However, in this application of the bilateral T hybrid, the common node 682 between amplifiers A1 and A2 is connected to a transducer that acts as a full duplex, audio input/audio device. Specifically, this transducer can be a speaker 684 that also acts as a microphone, or an earphone 686 that also acts as a microphone. The bidirectional current flow at the T connection represents the combined Rx signal, which is converted to audio output, and the incoming Tx signal, which is generated from audio input.

The transducer interface shown in FIG. 12 receives an Rx signal as input at input node 690. The Rx input signal passes through the capacitor 692, which filters low frequency components, and then to an automatic level control 694, which controls the level of the input signal via a variable resistor 696. The output of the automatic level control 694 passes through another level control implemented with a variable resistor 698. The receive signal is then fed to the positive input of amplifier A1 in the bilateral T hybrid circuit via capacitor 700.

The operation of the bilateral T hybrid in the transducer interface is similar to the operation described above in connection with the telephone interconnect of FIG. 10. The only difference is that the incoming signal is the Rx signal rather than the Tx signal. Due to the current mirror of amplifier A1, a current signal identical to the Rx signal at the positive input of A1 appears at the negative input of A1. This Rx signal is then fed to the transducer 684, which converts it to an audio output signal.

The Rx signal outputs of A1 and A2 have the same polarity and are substantially in common mode. As such, the Rx signals from A1 and A2 can be canceled by subtraction using a differential amplifier. Because of the virtual ground on the negative input of A1, the Tx signal generated by the transducer (684 or 686) will appear only at the output of A1 since the positive input of A2 only sees the virtual ground of A1. Thus, there is no common mode condition for the Tx signal output from the bilateral T hybrid 680, and the Tx signal is not canceled in the differential amplifier 714.

The remainder of the transducer interface shown in FIG. 12 is similar to the circuit to the right of nodes A and B in the transducer interface shown in FIG. 4. Like the transducer interface in FIG. 4, the output of the amplifiers A1 and A2 are connected to compressor-expanders 710, 712. Implemented with conventional compander ICs, the compressor-expanders are configured to decrease the size of the Rx signals from the amplifiers A1 and A2. The compressor-expander 710 connected to the output of amplifier A1 receives a combined Tx and Rx signal and expands the smaller Tx signal, while decreasing the larger Rx signal. The differential amplifier configuration 714 receives the outputs from the compressor-expanders 710, 712 and cancels the common mode Rx signal while passing the Tx signal. The output of the differential amplifier 714 is then transferred to another compressor-expander 716 via a level adjuster 718. The compressor-expander 716 is depicted differently in FIG. 12 because it is configured to increase the now larger Tx signal while further decreasing the smaller Rx signal. It produces a Tx output signal in which the Rx component is nearly entirely removed. Note that in FIG. 12, in contrast to FIG. 4, the compressor-expanders 710, 712, differential amplifier 714, and the expander-compressor 716 are connected together via capacitors 720–728. In addition, the output of expander-compressor 716 is also connected to a capacitor 730. While not critical to the invention, these capacitors can improved performance by filtering the DC component of the Tx and Rx signals.

The Balanced Impedance Configuration in a Transducer Interface

Figure 13:
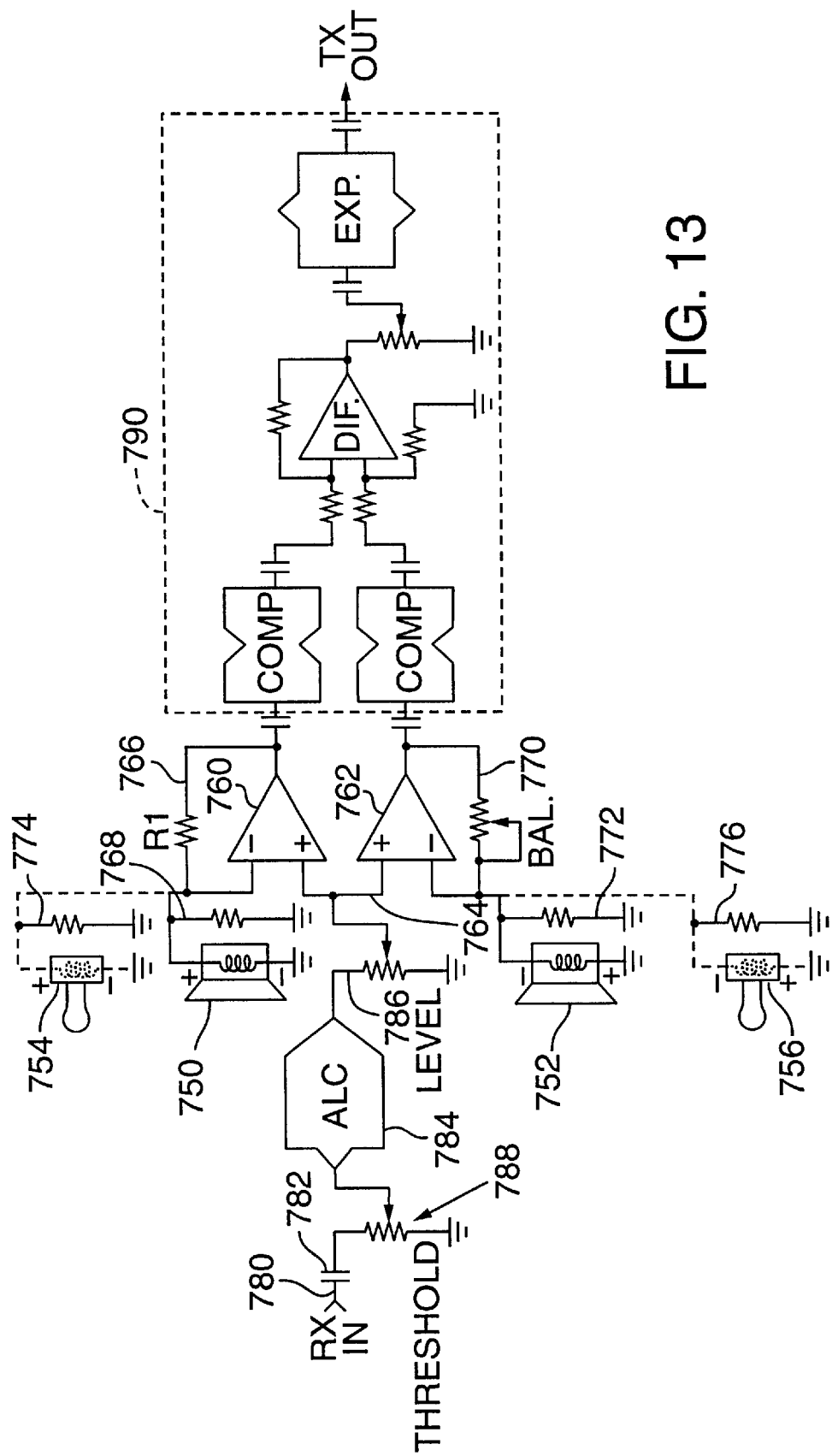
FIG. 13 is a schematic diagram illustrating a transducer interface that employs a balanced impedance configuration.

FIG. 13 is a schematic diagram illustrating a transducer interface that employs a balanced impedance configuration. Rather than balancing the impedance of the telephone line as in FIG. 11, the balanced impedance configuration in the transducer interface balances the impedance of a transducer that serves as both an input and output device. Depending on the application, this transducer can be a speaker 750, 752 or an earphone 754, 756. In the balanced impedance configuration shown in FIG. 13, the impedance of a transducer is matched using an identical transducer. Note that it is also possible to balance the impedance of a transducer (e.g., speaker 750) with an RC (or RLC) network in place of the matching transducer (e.g., speaker 752).

Like the balanced impedance configuration in FIG. 11, the one used in the transducer interface of FIG. 13 includes two op amps 760, 762, with their positive terminals connected together at a common node 764. The current mirror bias of the op amps 760, 762 acts like a current source that produces Rx signals at the negative inputs of the op amps 760, 762 that are identical to the Rx signal at the positive inputs.

The op amps 760, 762 receive the Rx signal at their positive inputs and drive the Rx signal into a transducer (750, 752) through their negative inputs. The negative inputs are at virtual ground, meaning their voltage with respect to ground is approximately zero. Each op amp has first resistor 766. 770 (e.g., R1) connected between its output and its negative terminal, and a second resistor 768, 772 (e.g., R2) connected between its negative terminal and ground. The second resistor is connected across the transducer 750, 752 to reduce the Q of the transducer. This resistor reduces the interference of the resonant frequency, (i.e., it dampens the resonant frequency interference). Since the virtual ground cannot sink current, all of the input current from the Rx signal at op amp 760 is forced through resistors R and R2 766, 768 and the transducer 750. The other amplifier 762 in the balanced impedance configuration operates similarly, except that the transducer (752) is connected with opposite polarity relative to the transducer (750).

The op amps 760, 762 produce Rx signals that are in common mode. As such, the common mode Rx signals can be canceled by subtraction in a differential amplifier.

In the transducer interface shown in FIG. 13, the Rx signal enters the transducer interface at input port 780 and passes through a capacitor 782, an automatic level control 784, and a level adjustor 786. The automatic level control adjusts the level of the signal via variable resistor 788. The circuitry between the input port 780 and node 764 is similar to the circuitry at the positive input of A1 in FIG. 12, and therefore, a description of its operation is not repeated here.

Since the transducers 750, 752 are coupled with opposite polarity relative to each other, the Tx signals that they generate will have opposite polarity. The Tx signals at the output of the op amps 760, 762 also have opposite polarity. Thus, the Tx signals can be combined in a differential amplifier to increase the Tx signal generated in the transducers.

The remainder of the transducer interface circuitry 790 shown in FIG. 13 is similar to the circuitry shown in the transducer interface of FIG. 12, and therefore, a description of it is not repeated here.

Transducer Interface Using Piezo-electric Transducers

Figure 14:
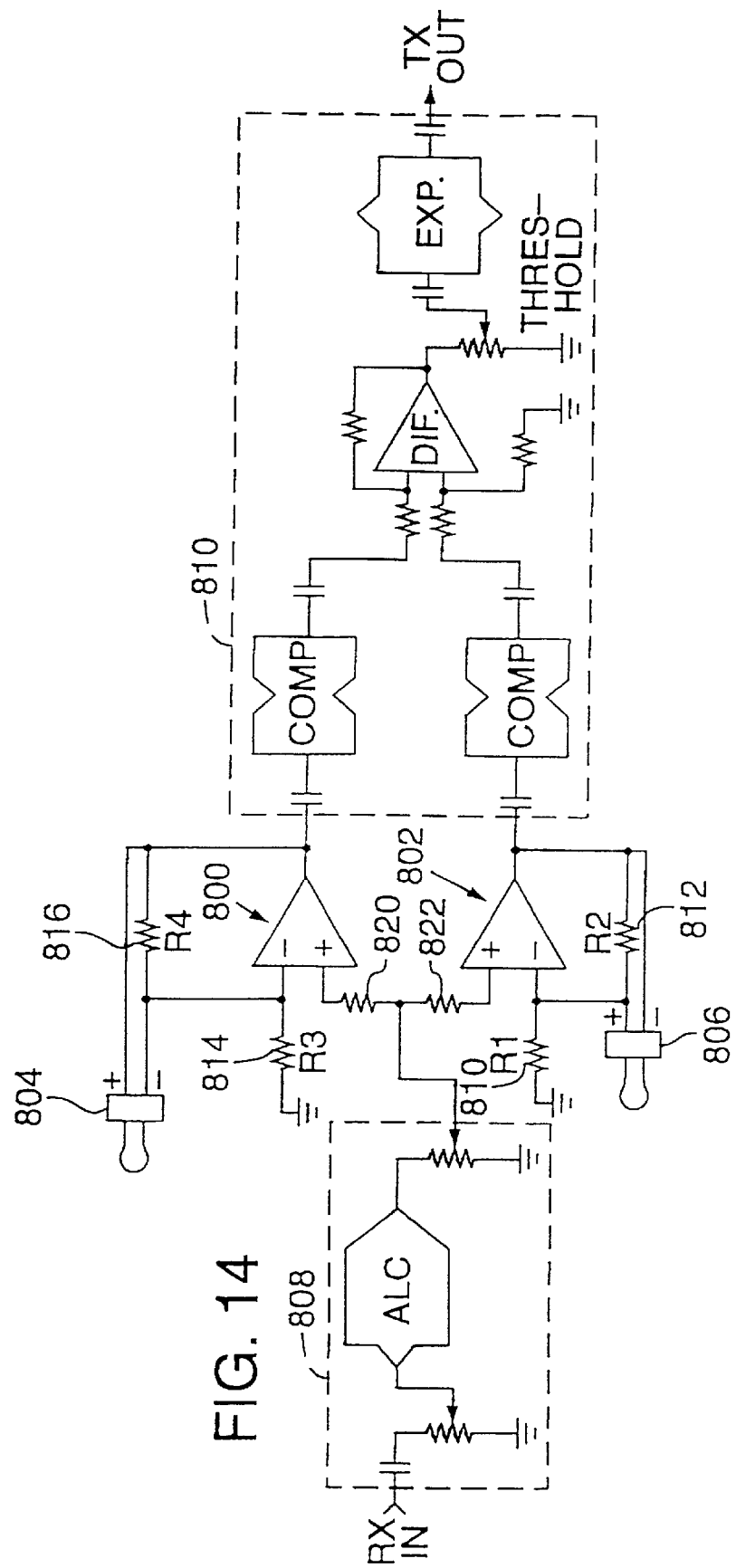
FIG. 14 is a schematic diagram illustrating a transducer interface for quartz transducers using an alternative balance impedance configuration.

FIG. 14 is a schematic diagram illustrating a transducer interface using an alternative balance impedance configuration. This configuration employs high impedance amplifiers 800, 802 to drive transducers 804, 806 in a balanced configuration. The transducer configuration in FIG. 14 receives an incoming Rx signal via input circuitry 808 that is similar to the input circuitry shown in FIGS. 12 and 13. In addition, the circuitry 810 at the output of the amplifiers 800, 802 is similar to the circuitry at the output of the amplifiers in FIGS. 12 and 13. Thus, a description of the input and output circuitry 808, 810 is not repeated here.

The transducer interface in FIG. 14 has a balanced impedance configuration because it has identical transducers 804, 806 connected to each of the amplifiers 800, 802. In contrast to the balanced configuration in FIG. 13, these transducers are connected between the output and the negative input terminals of the op amps 800, 802. This particular configuration is designed to use piezo-electric transducers. In particular, the implementation shown here is specifically designed for piezo-electric earphones that serve the dual function of generating a transmit signal from audio input and converting the receive signal into audio output. The reactive component of some transducers can adversely impact the frequency response of the amplifier in the frequency range where speech normally falls. The piezo-electric transducer provides improved performance for voice applications because the reactive component of the transducer has little or no effect on the frequency response of the amplifier. In this implementation, the piezo-electric transducer is a quartz transducer. Quartz transducers are beneficial because of the consistency of their impedance, which makes it easier to match the impedance of each transducer.

The amplifiers 800, 802 have a very high output impedance, which enables them to drive the transducers 804, 806 with minimal or no loading. The gain of the amplifiers in this implementation is preferably set to 1 by selecting resistors R1 and R2 with equal resistance. In addition, the gain of the amplifiers 800, 802 are matched so that the differential amplifier connected to the output of the amplifiers will substantially cancel the common mode components produced by the amplifiers 800, 802.

The amplifiers 800, 802 receive the Rx signal as input and transfer these signals to their outputs in common mode. Specifically, the Rx signal enters the positive terminal of each amplifier via a resistor 820, 822. The amplifiers 800, 802 are configured as voltage to current convertors. The current output of each amplifier, including the receive signal, is fed into the positive terminal of each transducer 804, 806. The transducers convert this receive signal into audio output.

The transducers also act as microphones, converting audio input into Tx signals. As a result, combined Tx and Rx signal appears at the output of each amplifier 800, 802. The Tx signal components of the outputs of the amplifiers 800, 802 have opposite polarity. Thus, when applied to the differential amplifier, the Tx signals are added together. In contrast, the receive signal at the outputs of the amplifiers has the same polarity, and thus, the differential amplifier substantially cancels the Rx signal component.

The full duplex circuits described above can be used to provide a 2-wire bi-directional signal path and separate 2-wire unidirectional signal paths. In a telephone device, a full duplex circuit can be used as a 2-wire to 4-wire circuit at the transducer and as a 4-wire to 2-wire circuit at the telephone line. The 4-wire to 2-wire circuit is not necessary in some devices that do not interface with 2-wire bi-directional transmission media like the telephone line. For example, cellular telephone devices transmit and receive signals on separate signal paths.

This aspect of cellular phones can cause feed-through problems when a 4-wire device such as a cellular phone communicates with a 2-wire device such as a conventional telephone. If the telephone has a conventional hybrid circuit, the hybrid will likely exhibit a phenomena known as return loss. Return loss is a characteristic of lossy hybrids in which signals "leak through" the hybrid. For example, instead of separating an incoming Rx signal from an outgoing Tx signal, a lossy hybrid will leak part of the Rx signal back to the telephone line. In addition, the lossy hybrid will leak part of the Tx signal back to the Rx signal path in the telephone.

Four-wire devices that communicate with 2-wire devices having lossy hybrids need to deal with the return loss from the 2-wire device. Part of the signal sent to the 2-wire device leaks through the hybrid and returns to the 4-wire device. This can be addressed in a number of ways. One way is to connect a comparator between the Rx and Tx signal paths in the 4-wire device to detect when the Tx signal sent from the 4-wire device is fed back to the Rx port of the 4-wire device. Based on the degree of similarity between the Tx and Rx signals in the 4-wire device, the comparator can activate an attenuator to reduce the Rx signal, and thus, reduce the impact of the feedback to the Rx side due to the return loss of a lossy hybrid.

Another approach is to use adaptive filters as in conventional full duplex speaker phone devices. Unlike the speaker phone devices described above, conventional speaker phone devices have separate microphones and speakers. These devices have to address acoustical feedback as well as the return loss phenomena described above. To address these forms of feedback, conventional speaker phones use adaptive filters, as in U.S. Pat. No. 4,629,829, which is hereby incorporated by reference. The adaptive filter takes the Tx signal as input and simulates the feedback of the Tx signal to the Rx port of the device. The simulated feedback signal can then be subtracted from the Rx signal. A similar approach can be used in 4-wire devices to deal with the return loss of a lossy hybrid.

Conclusion

While I have described implementations of the invention in detail, it is important to note that the scope of the invention is not limited to these specific implementations.

In view of the many possible embodiments to which the principles of my invention may be applied, it should be recognized that the illustrated embodiments are only examples of the invention and should not be taken as a limitation on the scope of the invention. Rather, the scope of the invention is defined by the following claims. I therefore claim as our invention all that comes within the scope and spirit of these claims.

I claim:

1. A bilateral T hybrid circuit comprising:
   first and second op amps, each having a positive input terminal, a negative input terminal and an output terminal, wherein the positive terminal of the second op amp is connected to the negative terminal of the first op amp to form a T connection, and wherein the output terminal of each op amp is coupled to its own negative input through a resistor;

wherein the positive terminal of the first op amp is operable to receive a first input signal, and in response to the first input signal, the first op amp is operable to produce a substantially identical signal component at the T connection via the negative input of the first op amp;

wherein the first and second op amps are configured to produce common mode signal components at the output terminals of each op amp corresponding to the first input signal;

wherein the first and second op amps are operable to receive a second input signal at the T connection and to produce output signal components at the output terminals corresponding to the second input signal that are substantially similar in magnitude and approximately 180 degrees out of phase.

2. The circuit of claim 1 further including a differential amplifier coupled to the output terminals and operable to cancel the common mode components and to combine the output signal components that are approximately 180 degrees out of phase.

3. The circuit of claim 2 further including a compressor-expander circuit coupled to the differential amplifier.

4. The circuit of claim 1 wherein the output terminal of one of the op amps is coupled to a matching impedance circuit for balancing the impedance at the T connection.

5. The circuit of claim 1 wherein the T connection is coupled to a telephone interface circuit.

6. The circuit of claim 5 wherein the telephone interface circuit includes:
a simulated inductor circuit for regulating flow of current from a telephone line.

7. The circuit of claim 5 wherein the telephone interface circuit includes:
an isolator circuit operable to be coupled to a telephone line for monitoring current flow from the telephone line and actuating a switch to open a signal path of the transmit signal when the current flow drops below a threshold or drops to zero.

8. The circuit of claim 7 wherein the isolator circuit includes an opto-coupler that is actuated by current flow from the telephone line.

9. The circuit of claim 7 wherein the telephone interface circuit includes:
a simulated inductor circuit for regulating flow of current from a telephone line.

10. The circuit of claim 5 wherein the T connection is coupled to the telephone interface via an isolation transformer.

11. The circuit of claim 1 wherein the first input signal is a receive signal and the second input signal is a transmit signal, and wherein the T connection is connected to a transducer for converting audio input into the transmit signal and for converting the receive signal representing audio data into audio output.

12. The circuit of claim 11 wherein the output terminals are coupled to a differential amplifier operable to cancel the common mode components and to combine the output signal components that are approximately 180 degrees out of phase.

13. The circuit of claim 11 wherein the output terminals are each coupled to a compressor-expander circuit for increasing the transmit signal and decreasing the receive signal.

14. A telephone line interconnect circuit comprising:
first and second op amps, each having a positive input terminal, a negative input terminal and an output terminal, wherein the positive terminals of the first and second op amps are connected together, and wherein the first and second op amps are operable to receive a transmit signal at the positive terminals and produce common mode transmit signal at the output terminals;
an isolation transformer coupled across the negative input terminal and the output terminal of the first op amp; wherein the isolation transformer is operable to transfer the transmit signal from the first op amp to a telephone line and to transfer a receive signal from the telephone line to the first op amp;
an impedance circuit coupled across the negative input terminal and the output terminal of the second op amp and operable to balance an impedance of the telephone line; and
a differential amplifier coupled to the output terminals of the first and second op amps, the differential amplifier operable to cancel a common mode transmit signal and pass the receive signal from the first op amp.

15. The circuit of claim 14 wherein the isolation transformer is operable to be connected to the telephone line via a telephone interface circuit.

16. The circuit of claim 15 wherein the telephone interface circuit includes:
a simulated inductor circuit for regulating flow of current from the a telephone line.

17. The circuit of claim 15 wherein the telephone interface circuit includes:
an isolator circuit operable to be coupled to the telephone line for monitoring current flow from the telephone line and actuating a switch to open a signal path of the transmit signal when the current flow drops below a threshold or drops to zero.

18. The circuit of claim 17 wherein the isolator circuit includes an opto-coupler that is actuated by current flow from the telephone line.

19. A full duplex communication circuit with a balanced impedance configuration, the circuit comprising:
first and second op amps, each having a positive input terminal, a negative input terminal and an output terminal, wherein the positive terminals of the first and second op amps are connected together, and wherein the first and second op amps are operable to receive a first input signal at the positive terminals and produce common mode signals corresponding to the first input signal at the output terminals;
a bi-directional device coupled across the negative input terminal and the output terminal of the first op amp; wherein the bi-directional device is operable to receive the first input signal from the first op amp and generate an output signal corresponding to the first input signal; and wherein the bi-directional device is operable to transfer a second input signal representing an incoming signal to the first op amp;
a matching impedance circuit coupled across the negative input terminal and the output terminal of the second op amp and operable to match an impedance of the bi-directional device; and
a differential amplifier coupled to the output terminals of the first and second op amps, the differential amplifier operable to cancel the common mode signals and pass a signal corresponding to the second input signal from the first op amp.

20. The circuit of claim 19 wherein the first input signal is a receive signal and the second input signal is a transmit signal, and wherein the bi-directional device comprises a transducer for converting audio input into the transmit signal and for converting the receive signal representing audio data into audio output.

21. The circuit of claim 20 wherein the matching impedance comprises a transducer for converting audio input into a second transmit signal and for converting the receive signal representing audio data into audio output.

22. The circuit of claim 20 further including a first compressor expander circuit coupled between the output terminal of the first op amp and the differential amplifier for increasing the transmit signal and decreasing the receive signal.

23. The circuit of claim 19 wherein the first input signal is a transmit signal and the second input signal is a receive signal representing audio data from a telephone line; and wherein the bidirectional device comprises a transformer for transferring the transmit signal to the telephone line and for transferring the receive signal from the telephone line to the first op amp.

24. The circuit of claim 23 wherein the transformer is operable to be coupled to the telephone line through a telephone interface circuit.

25. The circuit of claim 24 wherein the telephone interface circuit includes a simulated inductor for regulating the flow of current from the telephone line.

26. The circuit of claim 24 wherein the telephone interface circuit includes an isolator circuit operable to be coupled to the telephone line for monitoring current flow from the telephone line and actuating a switch to open a signal path of the transmit signal when the current flow drops below a threshold or drops to zero.

27. The circuit of claim 19 wherein the first input signal is a receive signal and the second input signal is a transmit signal, and wherein the bi-directional device comprises a piezo-electric transducer for converting audio input into the transmit signal and for converting the receive signal representing audio data into audio output.

28. A full duplex audio communication circuit for simultaneously producing audio output and transmitting audio input, the circuit comprising:
   a first piezo-electric transducer for converting audio input into an electrical transmit signal and for converting an electrical receive signal representing audio data into audio output; and
   an audio processing circuit coupled to the first transducer for receiving a combined signal including the transmit signal and the receive signal, for simultaneously expanding the transmit signal and compressing the receive signal to produce an output transmit signal, wherein the loop gain of the audio processing circuit is less than one.

* * * * *

UNITED STATES PATENT AND TRADEMARK OFFICE
CERTIFICATE OF CORRECTION

PATENT NO.     : 6,370,245 B1                                              Page 1 of 1
DATED          : April 9, 2002
INVENTOR(S)    : White It is certified that error appears in the above-identified patent and that said Letters Patent is hereby corrected as shown below:

Column 3,
Line 17, "T connect on" should read -- T connection --.

Column 14,
Line 6, "less the," should read -- less the --.

Column 15,
Line 63, "each Another." should read -- each other. --.

Column 17,
Line 16, "Tx=mV" should read -- Tx=300mV --.

Column 19,
Line 25, "fall duplex" should read -- full duplex --.
Line 30, "to. convert" should read -- to convert --.

Column 20,
Line 8, "voltage divide" should read -- voltage divider --.
Line 51, "Al" should read -- A 1 --.

Column 24,
Line 41, "766. 770" should read -- 766, 770 --.

Column 28,
Line 29, "from the a telephone line" should read -- from the telephone line --.

Signed and Sealed this

Third Day of September, 2002

*Attest:*

*Attesting Officer*

JAMES E. ROGAN
*Director of the United States Patent and Trademark Office*